US 8,761,709 B2

(12) United States Patent
Leinonen et al.

(10) Patent No.: US 8,761,709 B2
(45) Date of Patent: Jun. 24, 2014

(54) CONTROLLING A RECEIVER

(75) Inventors: Marko Leinonen, Haukipudas (FI);
Juha Valtanen, Oulu (FI); Seppo Rousu, Oulu (FI)

(73) Assignee: Nokia Corporation, Espoo (FI)

( * ) Notice: Subject to any disclaimer, the term of this patent is extended or adjusted under 35 U.S.C. 154(b) by 1007 days.

(21) Appl. No.: 12/224,710

(22) PCT Filed: Mar. 1, 2006

(86) PCT No.: PCT/IB2006/050635
§ 371 (c)(1),
(2), (4) Date: Sep. 2, 2008

(87) PCT Pub. No.: WO2007/099413
PCT Pub. Date: Sep. 7, 2007

(65) Prior Publication Data
US 2009/0023404 A1    Jan. 22, 2009

(51) Int. Cl.
*H04B 1/10*    (2006.01)

(52) U.S. Cl.
USPC ........... 455/307; 455/295; 455/283; 455/222; 455/254

(58) Field of Classification Search
USPC .............. 455/222–223, 283–312, 232.1–266, 455/317
See application file for complete search history.

(56) References Cited

U.S. PATENT DOCUMENTS

| | | | | |
|---|---|---|---|---|
| 3,622,891 A * | 11/1971 | Leland | ........................... | 455/286 |
| 4,225,960 A * | 9/1980 | Masters | ........................ | 714/798 |
| 5,226,057 A * | 7/1993 | Boren | ........................... | 375/350 |
| 5,282,222 A | 1/1994 | Fattouche et al. | | |
| 5,630,218 A * | 5/1997 | Muto | ........................... | 455/226.2 |
| 5,828,693 A * | 10/1998 | Mays et al. | .................... | 375/136 |
| 6,035,213 A | 3/2000 | Tokuda et al. | | |
| 6,064,861 A * | 5/2000 | Riley et al. | .................. | 455/67.13 |
| 6,452,981 B1 | 9/2002 | Raleigh et al. | | |
| 6,763,061 B1 | 7/2004 | Strait et al. | | |
| 6,795,424 B1 | 9/2004 | Kapoor et al. | | |
| 6,873,832 B2 * | 3/2005 | Shi | .............................. | 455/232.1 |
| 6,876,839 B2 * | 4/2005 | Harris | ........................... | 455/141 |
| 7,474,693 B2 * | 1/2009 | Busson et al. | ................. | 375/219 |
| 8,483,644 B2 * | 7/2013 | Busson et al. | ................. | 455/306 |
| 2002/0098796 A1 | 7/2002 | Dapper et al. | | |
| 2002/0131128 A1 | 9/2002 | Myers et al. | | |
| 2003/0007553 A1 | 1/2003 | Fifield | | |
| 2003/0104783 A1 | 6/2003 | Linder | | |
| 2003/0235254 A1 | 12/2003 | Fanson et al. | | |
| 2003/0236065 A1 | 12/2003 | Leinonen et al. | | |
| 2005/0107051 A1 | 5/2005 | Aparin et al. | | |

FOREIGN PATENT DOCUMENTS

| | | | | |
|---|---|---|---|---|
| EP | 0812069 A2 * | 4/1997 | ............... | H04B 1/12 |
| EP | 0 812 069 | 12/1997 | | |
| EP | 1 079 533 | 2/2001 | | |
| EP | 1 191 700 | 3/2002 | | |

(Continued)

*Primary Examiner* — Edward Urban
*Assistant Examiner* — Rui Hu
(74) *Attorney, Agent, or Firm* — Locke Lord LLP

(57) ABSTRACT

A receiver 650 operates in close proximity to at least one other component 610, 611, 612 causing interferences in signals received by the receiver 650. It is determined (steps 2002; 2003) whether and at which frequency a higher harmonic of and/or an inter-modulation product with signals generated by the other component 610 causes interference in signals received by the receiver 650, based on information about signals generated by the other component 610, 611, 612. At least one characteristic of the receiver 650 is adjusted to diminish an influence by a determined interference.

32 Claims, 23 Drawing Sheets

(56) References Cited

FOREIGN PATENT DOCUMENTS

| | | |
|---|---|---|
| EP | 1 271 779 | 1/2003 |
| EP | 1 432 154 | 6/2004 |
| EP | 1 507 376 | 2/2005 |
| WO | 97/40609 | 10/1997 |
| WO | 98/51049 | 11/1998 |
| WO | 01/28310 | 4/2001 |
| WO | 03/092178 | 11/2003 |
| WO | 03/105386 | 12/2003 |
| WO | 2004/086709 | 10/2004 |
| WO | 2004/109942 | 12/2004 |
| WO | 2005/006567 | 1/2005 |

\* cited by examiner

CONTROLLING A RECEIVER

FIELD OF THE INVENTION

The invention relates to a method for controlling a receiver, which receiver operates in close proximity to at least one other component causing interferences in signals received by the receiver. The invention relates equally to a corresponding arrangement, to a corresponding device, to a corresponding system, to a corresponding software code and to a corresponding software program product.

BACKGROUND OF THE INVENTION

Various receivers receiving signals in a first frequency band may operate in close proximity to other components, which operate at another frequency band but cause interfering higher harmonics and/or inter-modulation products within the first frequency band.

For example, there will be an increasing number of mobile devices, which comprise various combinations of cellular communication transceivers (combined transmitter and receiver) on the one hand and Orthogonal Frequency Division Multiplex (OFDM) receivers on the other hand, and in which higher harmonics of the cellular communication transceivers transmissions may fall into an OFDM reception frequency band.

OFDM is a modulation technique in which the original data is divided into several smaller data streams, each using a different narrowband sub-carrier in the frequency domain. Each sub-carrier is modulated with Binary Phase Shift Keying (BPSK), a Quadrature Phase Shift Keying (QPSK), a 16 Quadrature Amplitude Modulation (16QAM) or a 64QAM modulation scheme, as an example. For transmission, the signal is transformed into the time-domain. The OFDM receiver transforms the signal back into the frequency-domain for regaining the original data from the sub-carriers.

OFDM will be the dominant modulation technique in upcoming wireless standards. OFDM has already been selected as modulation technique for Wireless Local Access Networks (WLAN), Worldwide Interoperability for Microwave Access (Wimax), Ultra WideBand (UWB) and Digital Video Broadcasting Handhelds (DVB-H).

Currently, for example, there are WLAN and Global System for Mobile communications (GSM) and Bluetooth™ transceivers integrated into the same mobile terminal.

In future handheld devices, a DVB-H receiver may be integrated for instance along with a cellular mobile phone operating according to the GSM standard or to the Wideband Code-Division Multiple Access (WCDMA) standard.

An exemplary system 100 employing a GSM transceiver 110 and an OFDM receiver 150 is illustrated in FIG. 1.

The GSM transceiver 110 comprises an antenna 111, which is connected to a component 112 having the functionality of a duplexer. The functionality of duplexer component 112 may be implemented by radio frequency switches. The component 112 connects on the one hand the antenna 111 to a reception chain and on the other hand a transmission chain to the antenna 111.

In the reception chain, the duplexer 112 is connected via a variable gain low noise amplifier 121, a downconversion mixer 122, a baseband filter 123 and an analog-to-digital (A/D) converter 124 to a digital signal processor (DSP) 114.

The output of the A/D converter 124 is linked within the DSP 114 via a bit detection block 126 to a decoding block 127. The DSP 114 further comprises a received signal strength indication (RSSI) determination block 128. The outputs of the A/D converter 124 and of the bit detection block 126 can be linked in addition to the input of the RSSI determination block 128, which controls the variable gain low noise amplifier 121.

In the transmission chain, a coding block 137 of the DSP 114 is connected via a bit generation block 136 of the DSP 114 to a digital-to-analog (D/A) converter 134. The D/A converter 134 is connected via a baseband filter 133, an upconversion mixer 132 and a variable gain power amplifier 131 to the duplexer 112. A local oscillator 113 is connected to both downconversion mixer 122 and upconversion mixer 132.

The OFDM receiver 150 comprises an antenna 151, which is connected via a variable gain low noise amplifier 161, a downconversion mixer 162, a baseband filter 163 and an A/D converter 164 to a DSP 154. The output of the A/D converter 164 is linked within the DSP 154 via a Fast Fourier Transformation (FFT) block 165 and a bit detection block 166 to a decoding block 167. The DSP 154 further comprises an RSSI determination block 168. The outputs of the A/D converter 164 and of the FFT block 165 can be linked in addition to the input of the RSSI determination block 168, which controls the variable gain low noise amplifier 161.

A problem that may occur with such a combination is that harmonics of transmissions by the GSM transceiver 110 occur within the radio frequency (RF) band supported by the OFDM receiver 150. The interference level which the GSM transceiver 110 generates may be dozens of decibels higher than the received OFDM signal level.

The currently used WLAN standard 802.11b and Bluetooth™ use the 2.4 GHz frequency band, which suffers from the third harmonic of GSM850 transmissions at the highest US channel.

When the WLAN standard 802.11a using the 5 GHz band is integrated into mobile terminals, the problems will expand. In this case, the third harmonic of GSM1800 transmissions will hit to the WLAN reception/transmission band.

While in WLAN there are eleven channels, in the US DVB-H system there will be only one RF channel at 1670-1675 MHz. The most severe problem will thus occur with DVB-H in the U.S.A., since the second harmonic of the GSM850 band transmissions will hit to the single DVB-H US channel, while the use of another channel is not enabled.

In the upcoming Wimax standard in Europe, most probably the 3.5 GHz band will be deployed, which will suffer from interferences due to the second harmonic of GSM1800 transmissions.

The interference problem is illustrated for two scenarios in FIG. 2. FIG. 2 is a diagram illustrating various power levels in dBm for DVB-H, WLAN, GSM and WCDMA over frequency.

GSM850 operates at frequencies around 850 MHz with a transmission power level of +33 dBm. GSM1800 operates at frequencies around 1800 MHz with a transmission power level of +30 dBm. WCDMA2100 operates at frequencies around 2100 MHz with a transmission power level of +21 dBm. The mobile terminal transmission power levels may be varied dependent on the supported power class of the product.

US DVB-H operates in a frequency range of 1670-1675 MHz. As indicated in FIG. 2, the second harmonic of GSM850 transmissions falls into the US DVB-H channel with a maximum power level of −30 dBm, depending on an attenuation between transmission and reception antennas. This is in line with the GSM/WCDMA transmission spurious emission specification, which sets a limit of −30 dBm. The minimum signal level for DVB-H, however, is −95 dBm. Thus, there may result a negative signal-to-interference (S/I)

ratio for a US DVB-H reception in case of an ongoing GSM850 transmission in close vicinity, for example in the same device.

WLAN 802.11a operates in a frequency range of 5130-5725 MHz in Europe, of 5180-5825 MHz in US and of 4190-5350 MHz in Japan. As indicated in FIG. 2, the third harmonic of GSM1800 transmissions falls into the WLAN 802.11a band with a power level of about −60 dBm. The minimum signal level for WLAN, however, is less than −90 dBm. Thus, there may result a negative S/I ratio for the WLAN reception in case of an ongoing GSM1800 transmission in close vicinity.

The occurrence of further harmonics, which may result in interferences in other frequency bands, is only indicated for completeness.

Similar problems may occur when a UWB receiver is integrated into the same device as the transmitter or transceiver of some other system. A media terminal may enable for example a voice and data connections using GSM or WCDMA and in addition data connections using UWB.

When the UWB system was specified, it was a target that UWB does not interfere with other systems. It was not considered, in contrast, how other systems will interfere with UWB receptions in combined terminals.

Possible interference scenarios occurring in case a UWB receiver and a GSM/WCDMA transceiver are integrated into the same device are illustrated in FIG. 3. FIG. 3 is a diagram indicating various power levels in dBm for GSM, WCDMA and UWB over frequency.

In a UWB receiver, a reception band filter following upon the antenna filters out frequencies which are below 3.1 GHz and above 10.6 GHz. Thus, the fundamental frequencies of GSM900 transmissions having a power level of +33 dBm, of GSM1800 transmissions having a power level of +30 dBm and of WCDMA2000 transmissions having a power level of +21 dBm are suppressed.

However, the power level of generated second to fifth harmonics of GSM1800 and WCDMA2000 transmissions is much higher than the power level of a received UWB signal.

This high interfering power level corrupts the UWB signal. As a result, the UWB data throughput is lowered or completely stopped, depending on received UWB signal strength.

Also the fifth and higher harmonics of GSM900 transmissions, not shown in FIG. 3, will fall into the UWB band.

Interference situations that may occur in case a UWB receiver and a WLAN transceiver are integrated into the same device are illustrated in FIG. 4. FIG. 4 is a diagram indicating various power levels for UWB and WLAN over frequency.

Due to the above mentioned filtering in a UWB receiver, the fundamental frequencies of WLAN 802.11b transmissions having a power level of +20 dBm can also be suppressed. Still, the suppression level is lower than in the case of GSM and WCDMA, since there is only a transition band of about 600 MHz from the highest WLAN frequency to the lowest UWB frequency. Further, the second harmonic of WLAN transmissions at a power level of about −40 dBm, the third harmonic of WLAN transmissions at a power level of about −60 dBm and the fourth harmonic of WLAN transmissions cause interferences in the UWB band.

WLAN 802.11a operating at 5 GHz uses a frequency band within the UWB frequency band with a power level of +20 dBm. Consequently, those two systems can not operate at the same time, since transmitted WLAN signal will saturate the low noise amplifier of the UWB receiver completely.

It might be noted that a second, alternative UWB standard proposal by the multiband OFDM consortium is based on OFDM. This is illustrated in FIG. 5. FIG. 5 is a diagram illustrating thirteen radio channels of 528 MHz each. The channels are divided into four groups A-D. In the proposed UWB specification, each 528 MHz radio channel is divided into 128 sub-carriers.

Known approaches for dealing with interferences typically consider only situations in which the desired signal has a higher level than the interference so that the S/I ratio is positive.

In PCT application WO 03/105386, it has been proposed to avoid interference by switching off a receiver of a device while a transmitter of the device is sending out a transmission burst.

In PCT application WO 04/109942, it has been proposed to minimize a wide band noise interference from the first transmitter to the second receiver by changing antenna tuning of the second receiver from the first frequency band to second frequency band when wide band noise is expected at the first frequency band.

In US patent application 2003/0235254, it has been proposed to identify a channel that is jammed by a narrowband jamming signal by comparing the signal in each channel to an average of powers of adjacent channels. Channels that are identified as being jammed are included in a jam mask for use in subsequent processing.

SUMMARY OF THE INVENTION

It is an object of the invention to improve the interoperability between a receiver and other components operating at close proximity to each other.

A method for controlling a receiver is proposed. The receiver is assumed to operate in close proximity to at least one other component causing interferences in signals received by the receiver. The method comprises determining whether and at which frequency at least one of a higher harmonic of and an inter-modulation product with signals generated by the at least one other component causes interference in a signal received by the receiver, based on information about signals generated by the at least one other component. The method further comprises adjusting at least one characteristic of the receiver to diminish an influence by a determined interference.

Moreover, a chipset comprising at least one chip for controlling a receiver is proposed. The receiver is assumed to operate in close proximity to at least one other component causing interferences in signals received by the receiver. The at least one chip includes a processing component adapted to determine whether and at which frequency at least one of a higher harmonic of and an inter-modulation product with signals generated by the at least one other component causes interference in a signal received by the receiver, based on information about signals generated by the at least one other component the at least one chip further includes a processing component adapted to adjust at least one characteristic of the receiver to diminish an influence by a determined interference.

Moreover, an arrangement is proposed, which comprises a receiver and at least one other component operating in close proximity to the receiver and causing interferences in signals received by the receiver. The arrangement further comprises processing components that are adapted to realize the same functions as the components of the proposed chipset. It is to be understood that in this case, the processing components may be realized by hardware and/or software. They may be realized for instance by a processor executing corresponding software codes or by a chip with an integrated circuit realizing the required functions.

The arrangement can be for instance integrated in an electronic device. Alternatively, however, it could also be distributed to several devices of some system, like a mobile phone and an accessory. It is only required that an interaction is enabled between the receiver and the processing components on the one hand and the other component and the processing components on the other hand.

Moreover, a software code for controlling a receiver is proposed. The receiver is assumed again to operate in close proximity to at least one other component causing interferences in signals received by the receiver. When being executed by a processor, the software code realizes the proposed method.

Finally, a software program product is proposed, in which the proposed software code is stored in a readable medium.

The invention proceeds from the consideration that while it may be ensured in many cases that the fundamental frequency of signals generated by a component does not interfere with adjacent receivers, its higher harmonics or inter-modulation products may fall into the reception band of the receiver. Inter-modulation products may occur if several signals are generated in parallel by different components and one signal modulates the other, resulting in further potentially interfering frequencies. It is therefore proposed to determine the interference caused by higher harmonics or inter-modulation products of close components. Since a component causing interferences has information about the signals it generates, this state information can be exploited for determining the higher harmonics or inter-modulation products. The determined interference is then cancelled as much as possible by adjusting suitable receiver characteristics.

It is an advantage of the invention that it enables a receiver to stand more interference from other components. Consequently, the interoperability between a receiver and other components can be improved.

It is to be understood that the frequencies of inter-modulation products generated by the at least one other component, which causes interference in a signal received by the receiver, may also be determined based on information about several signals contained in the inter-modulation product and thus based on information about signals from a plurality of components. It has to be noted that the signals that are involved in causing inter-modulation products can be signals at a fundamental frequency and/or higher harmonics.

The invention can be employed for any receiver. It is to be understood any receiver to which it is referred may be as well a transceiver. It is of particular advantage, though, for OFDM receivers, like DVB-H receivers, WLAN receivers, Wimax receivers, UWB receivers, etc.

While GSM and WCDMA systems cover the entire employed RF channel with their modulation, an OFDM system modulates a large number of narrow sub-carriers within the employed RF channel in parallel. As a result, an OFDM system is more robust to a narrow band filtering inside of the OFDM channel, which occurs when a receiver is moving and the receiver faces a fading communication channel. When a few sub-channels are removed, the other sub-channels will remain untouched, which ensures a clear reception at the other sub-channels. If a similar narrow band filtering is applied to a WCDMA signal, for instance, then all signal bits are affected and the overall signal-to-noise (S/N) ratio is reduced.

The OFDM technology is well established and has been adopted by several standards, including standards for Asymmetric Digital Subscriber Line (ADSL) services, for Very High Speed Digital Subscriber Line (VDSL), for Digital Audio Broadcast (DAB) and for Digital Terrestrial Television Broadcast, for example DVB in Europe and Integrated Services Digital Broadcasting (ISDB) in Japan. Further, the WLAN standards IEEE 802.11a/g, 802.16a are based on OFDM. Because OFDM is suitable for high data-rate systems, it is also an option for the fourth generation (4G) wireless services standard and the IEEE 802.11n and IEEE 802.20 standards.

The at least one other component can comprise in particular a transmitter of any type. It is to be understood any transmitter to which it is referred may be as well a transceiver. Examples for transmitters for a mobile communication link are a GSM transmitter and a WCDMA transmitter. An example for a transmitter for a wireless communication link is a WLAN transmitter. It has to be noted, though, that the at least one other component is not limited to transmitters. It may also comprise any other component operating at known frequencies and generating interfering higher harmonics, like displays, processors, memories, etc.

In particular in those cases, in which interference in a received signal is significantly stronger than the actual signal, minimizing the interference only with digital signal processing means might not be sufficient, since the detected signal consists almost entirely of interference. For taking account of these cases, the determined interference is advantageously cancelled as much as possible in the analog domain. This approach is particularly suited for a signal recovery under negative S/I conditions, while conventional approaches deal mainly with positive S/I conditions.

In one embodiment of the invention, adjusting at least one receiver characteristic comprises therefore adjusting a filtering of the signal received by the receiver at least in an analog domain to filter the frequency of the determined interference from the signal received by the receiver.

In one embodiment of the invention, adjusting at least one receiver characteristic comprises adjusting antenna characteristics so that of the interference signal received by the receiver is minimized. Antenna characteristics can be changed by altering the antenna matching. Antenna matching will equally perform a signal filtering in an analog domain.

A filtering in an analog domain, which is adjusted according to the invention, can be applied to the signal received by the receiver at radio frequency, at an intermediate frequency or at a baseband frequency.

The filtering in an analog domain can be adjusted for example by selecting suitable filters from a filter bank or by changing filter characteristics. Both approaches can be used for instance for adjusting a notch frequency of a notch filter filtering the signal received by the receiver. This kind of adjustment can be used in particular for an adjustment of an analog baseband filtering.

If the filtering in an analog domain is applied to the signal received by the receiver at an intermediate frequency, the filtering can be adjusted instead by adjusting the intermediate frequency. The signal at an adjusted intermediate frequency may then be filtered with a notch filtering using a fixed notch frequency. The adjustment of the filtering will become apparent in the baseband signal.

The filtering in the analog domain is not ideal. The lack of ideality of the filtering in an analog domain may be corrected by a filtering in a digital domain.

In one embodiment of the invention, the power level of a higher harmonic of signals generated by the at least one other component and/or the power level of inter-modulation products with the signals generated by the at least one other component is determined in addition based on information about signals generated by the at least one other component.

In one embodiment, the receiver and the at least one other component could be integrated in a single device, and the inter-modulation product is generated by the at least one other component and an external interference source.

In one embodiment of the invention, the power level of a higher harmonic of signals and/or of inter-modulation products generated by the at least one other component, which causes interference in a signal received by the receiver in a first terminal, may be determined in addition to interference signal received from a second terminal. The second terminal may be connected to the first terminal with wireless connection or with galvanic connection. The second terminal may be connected to a wireless network, but it is located so near to the first terminal, that interference generated in second terminal's at least one component, will interfere the first terminal receiver.

The determined power level may then be used as a basis for controlling a gain of a variable amplifier of the receiver. The gain constitutes thus a further receiver characteristic that may be adjusted.

Alternatively or in addition, the determined power level may be used as a basis for adjusting a range of an A/D conversion, which is applied to the signal received by the receiver after the filtering in an analog domain. The range of an A/D conversion constitutes thus a further receiver characteristic that may be adjusted.

Moreover, an interference minimization can be carried out by digital signal processing. An interference minimization in the digital domain can be achieved for instance by an adaptive signal selection or by filtering received signals digitally based on known state information on the other component. The signal selection can be performed for instance in a time domain, in a frequency domain and/or at a bit level domain.

In one embodiment of the invention, a filtering of the signal received by the receiver in a digital domain is adjusted to filter the frequency of the determined interference from the signal received by the receiver. The characteristics of the digital filtering thus constitute a further receiver characteristic that may be adjusted.

In one embodiment of the invention, a timing at which a higher harmonic of signals generated by the at least one other component and/or of inter-modulation products generated by the at least one other component causes interference in a signal received by the receiver is determined in addition based on information about signals generated by the at least one other component.

The determined timing can then be used as a basis for interrupting a bit detection, which is performed on the signals received by the receiver. The settings of the bit detection thus constitute a further receiver characteristic that may be adjusted.

Alternatively or in addition, a coding scheme and/or a modulation scheme that is applied to data in the signals received by the receiver may be adjusted synchronized to the determined timing. The coding scheme and/or a modulation scheme thus constitute a further receiver characteristic that may be adjusted.

If the at least one other component comprises a transmitter including an antenna, an antenna isolation may be calculated between an antenna of the receiver and the antenna of the transmitter. This antenna isolation may then be considered for determining a power level of interferences caused by a higher harmonic of and/or by inter-modulation products with signals generated by the transmitter in a signal received by the receiver.

It is to be understood that any of the exemplary embodiments presented for the proposed method may be implemented as well in the proposed arrangement, in the proposed device, in the proposed system, in the proposed software code and in the proposed software program product.

BRIEF DESCRIPTION OF THE FIGURES

Other objects and features of the present invention will become apparent from the following detailed description considered in conjunction with the accompanying drawings.

DETAILED DESCRIPTION OF THE INVENTION

Figure 6:
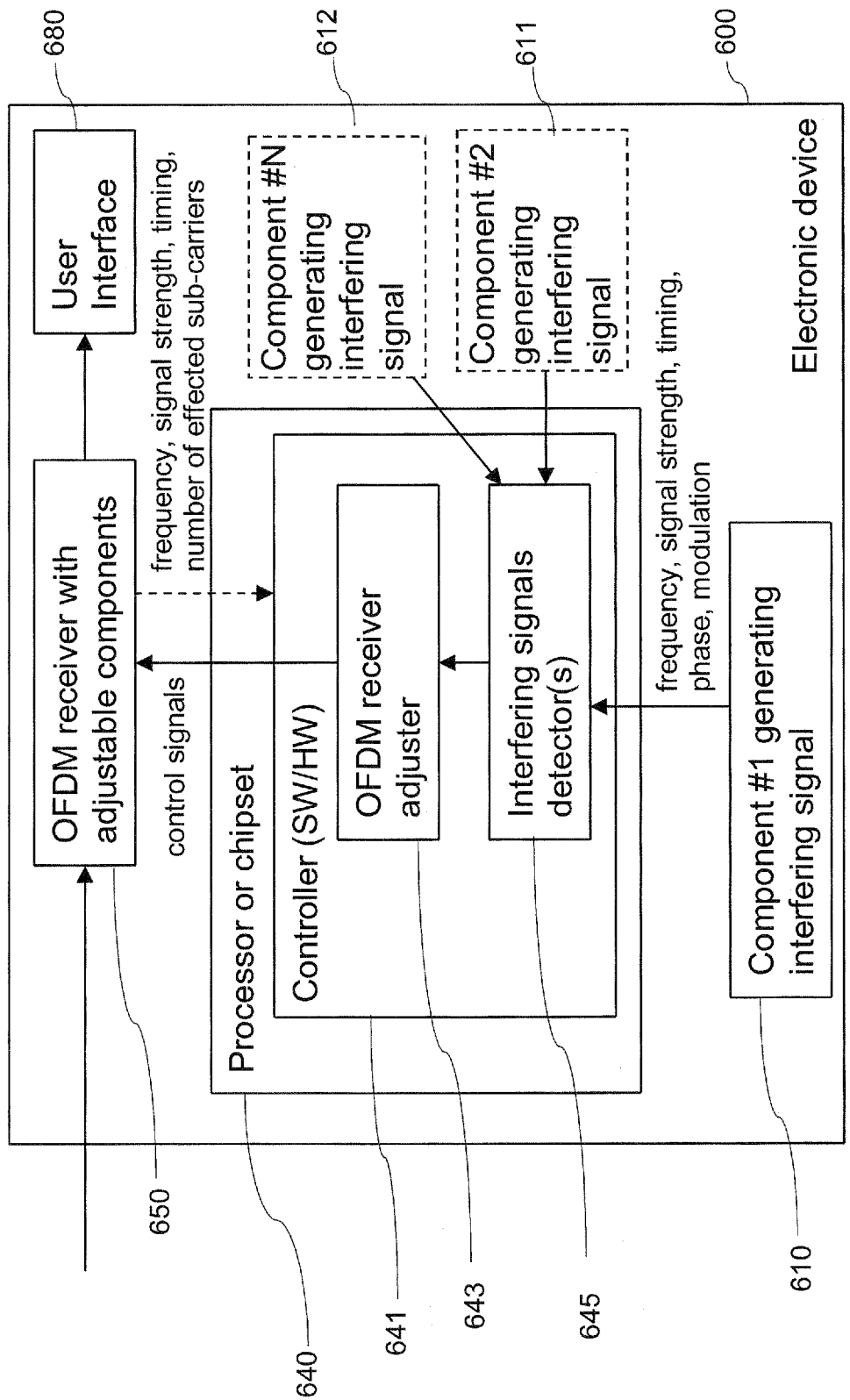
FIG. 6 is a schematic block diagram of an exemplary electronic device according to an embodiment of the invention including an OFDM receiver.

FIG. 6 is a schematic block diagram of an exemplary device, which enables an interference reduction in accordance with an embodiment of the invention.

The electronic device 600 can be for example a media terminal.

The electronic device 600 comprises an OFDM receiver 650 with adjustable components. The OFDM receiver 650 is adapted to receive radio signals in a predefined frequency band and outputs processed signals to a user interface 680, for example to a display and to loudspeakers. The OFDM receiver 650 can be for example a DVB-H receiver or a receiver part of an UWB transceiver or a WLAN transceiver.

The electronic device 600 further comprises a component 610 generating signals with interfering harmonics in the OFDM frequency band. This component 610 can be for example a GSM or WCDMA transceiver or a Bluetooth™ transceiver. However, it may also be a component 610 that is not adapted to transmit any radio frequency signals, but which operates at a known frequency causing harmonics in the OFDM frequency band. It could be for example a display belonging to the user interface 680, a processor a memory or an electrical interface, etc. There could also be multiple components 610, 611 and 612 generating signals with interfering harmonics or inter-modulation products in the OFDM frequency band. Such additional interfering components 611, 612 are indicated in FIG. 6 with dashed lines.

The electronic device 600 further comprises a controller 641 for the OFDM receiver 650. The controller 641 includes an interfering signals detector block 645 receiving information on the operation of the component 610. The controller 641 further includes an OFDM receiver adjuster block 643 which is linked to the interfering signals detector block 645 and which provides control signals to the OFDM receiver 650. In case of multiple interfering components 610, 611, 612, the interfering signals detector block 645 can combine information from several components 610, 611, 612 and provide the combined information to the OFDM receiver adjuster block 643 as a basis for control signals to the OFDM receiver 650. The controller 641 can be implemented in hardware and/or in software. If implemented in software, corresponding software code may be executed by a processor 640 of the device 600. If implemented in hardware, corresponding circuitry may be integrated for example in a chip or chipset of the device 600.

It is to be understood that the controller 641 could also be integrated in component 610 or in the OFDM receiver 650, or that the functions of the controller 641 could also be distributed at least partly to component 610 and/or to the OFDM receiver 650.

As indicated in FIG. 6 by a dashed arrow, the OFDM receiver 650 may equally provide an input to the controller 641, especially to the harmonic interference detector block 645. The input information which the OFDM receiver 650 can provide for block 645 may include for instance an interfering signal band width, a frequency of interference signal, a power level of interfering signal and a timing of the interference. The interfering signal band width can be defined by observing the number of defected sub-carriers in a received signal. The interfering signal power level can be detected by comparing the defected sub-carrier power levels to un-defected sub-carrier power levels. The timing information of interference can be used to control when interference is present and when it is not.

When the provided information indicates that interference is not present at the OFDM receiver 650, the OFDM receiver adjuster block 643 may not need to operate. If the OFDM receiver 650 received signal level is higher than pre-defined threshold value level, then the OFDM receiver adjuster block 643 may not need to operate.

Figure 1:
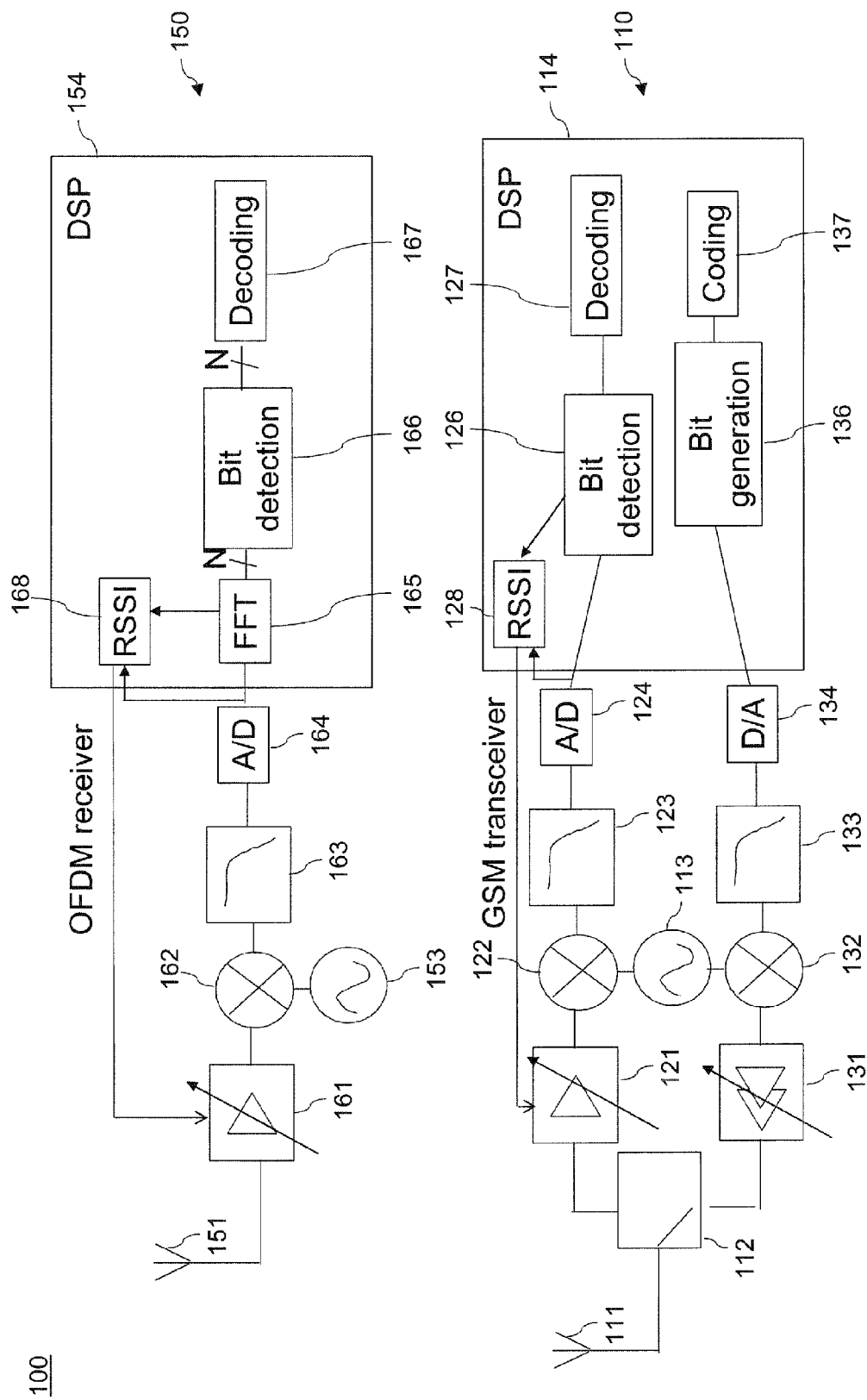
FIG. 1 is a schematic block diagram of a conventional communication device supporting GSM and OFDM.
Figure 2:
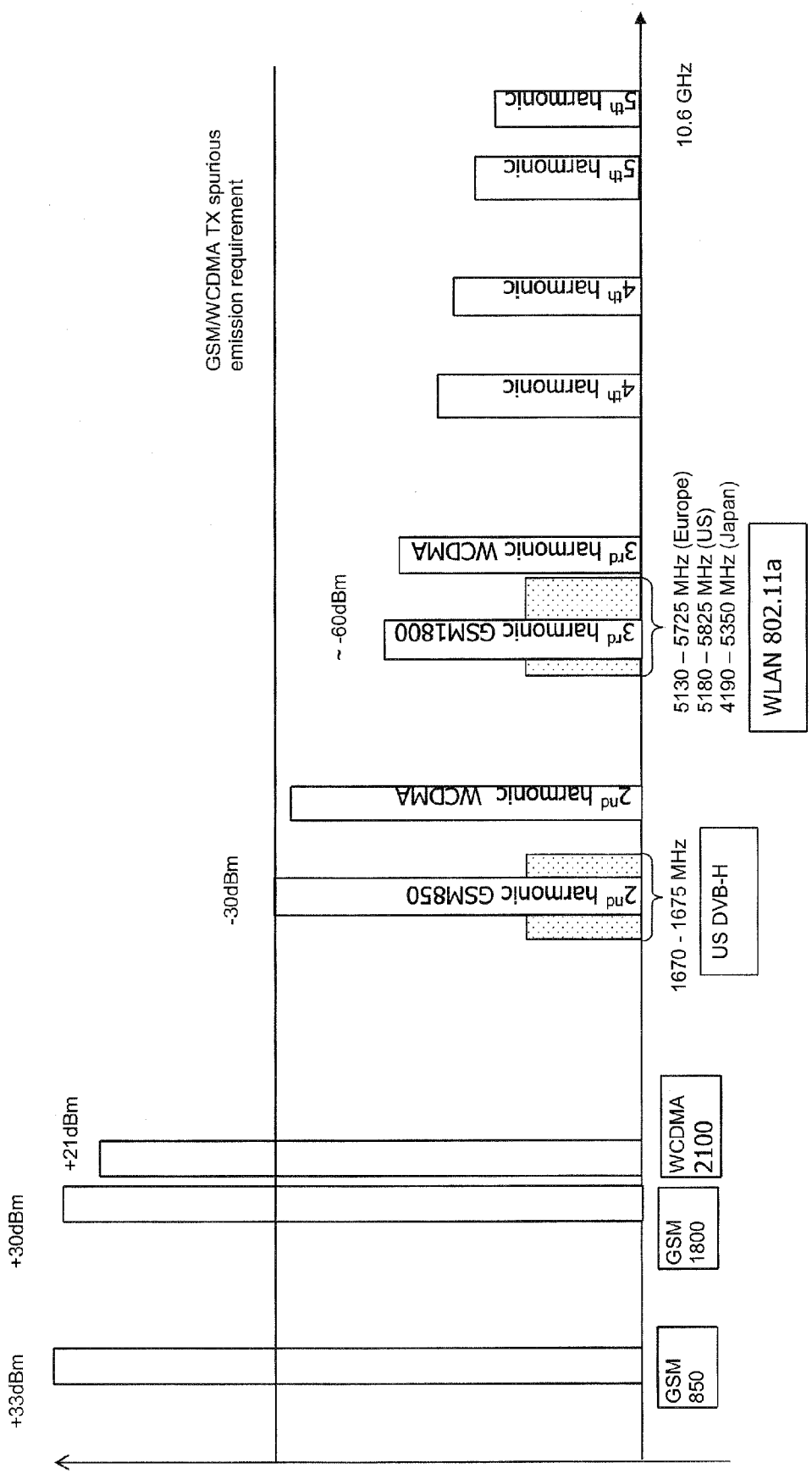
FIG. 2 is a diagram illustrating interferences caused by harmonics of GSM transmissions in a DVB-H RF band and a WLAN RF band.
Figure 3:
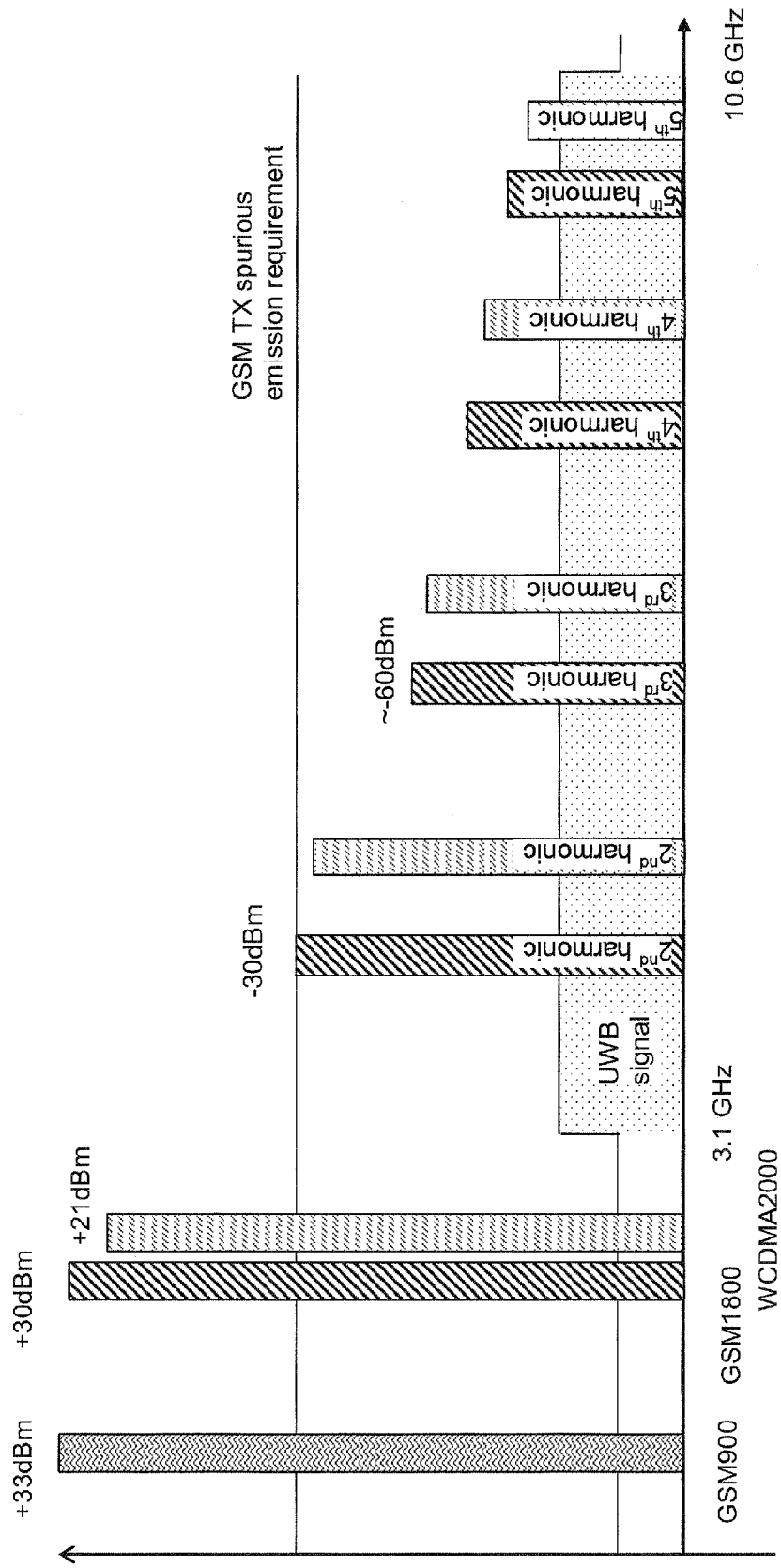
FIG. 3 is a diagram illustrating interferences caused by harmonics of GSM and WCDMA transmissions in a UWB RF band.
Figure 4:
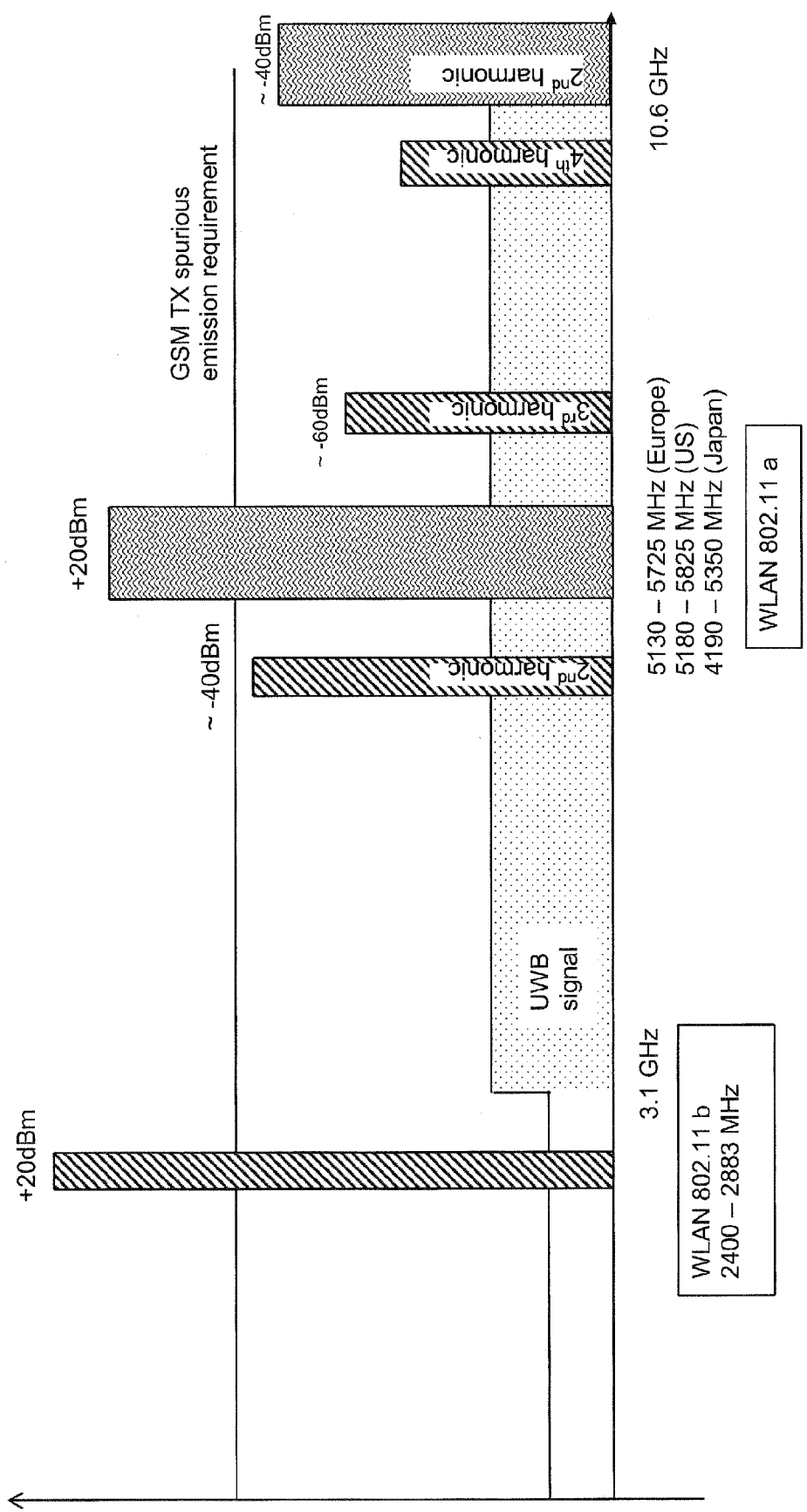
FIG. 4 is a diagram illustrating interferences caused by harmonics of WLAN transmissions caused in a UWB RF band.
Figure 5:
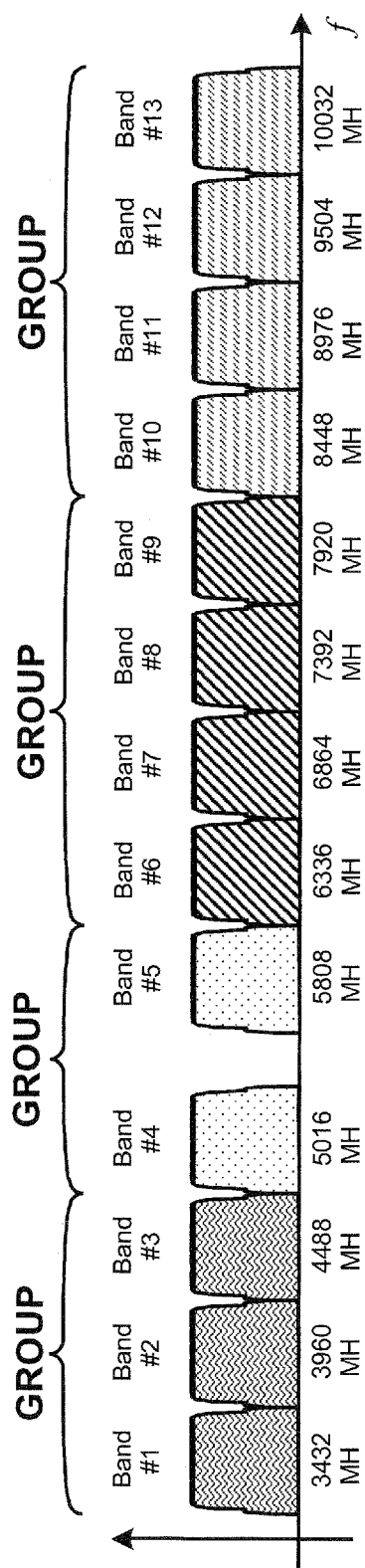
FIG. 5 is a diagram illustrating UWB using OFDM.
Figure 7:
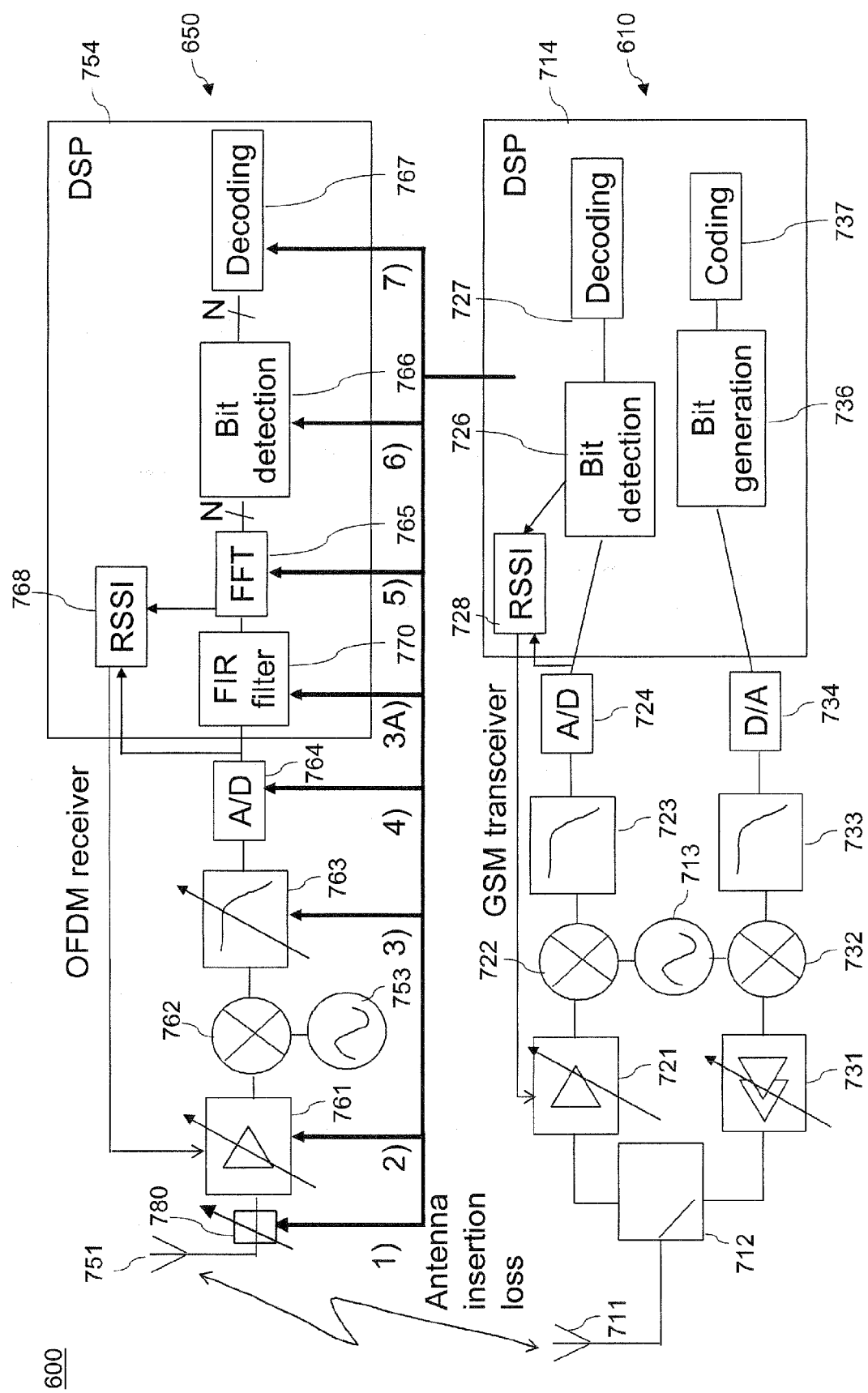
FIG. 7 is a schematic block diagram illustrating details of the electronic device of FIG. 6.

FIG. 7 is a schematic block diagram illustrating details of the OFDM receiver 650 and the component 610, which are similar to those of FIG. 1.

The component 610 is assumed by way of example to be a GSM transceiver. It comprises an antenna 711, which is connected via a component 712 having the functionality of a duplexer to a reception chain and a transmission chain.

In the reception chain, the duplexer 712 is connected via a variable gain low noise amplifier 721, a downconversion mixer 722, a baseband filter 723 and an A/D converter 724 to a DSP 714. The output of the A/D converter 724 is linked within the DSP 714 via a bit detection block 726 to a decoding block 727. The DSP 714 further comprises an RSSI determination block 728. The outputs of the A/D converter 724 and of the bit detection block 726 may be linked in addition to the input of the RSSI determination block 728, which controls the variable gain low noise amplifier 721. In the transmission chain, a coding block 737 of the DSP 714 is connected via a bit generation block 736 of the DSP 714 to a D/A converter 734. The D/A converter 734 is connected via a baseband filter 733, an upconversion mixer 732 and a variable gain power amplifier 731 to the duplexer 712. A local oscillator 713 is connected to both downconversion mixer 722 and upconversion mixer 732.

The OFDM receiver 650 is assumed by way of example to be a DVB-H receiver. It comprises an antenna 751, which is connected via an antenna tuning circuitry 780, a variable gain amplifier 761, a downconversion mixer 762, a baseband filter 763 and an A/D converter 764 to a DSP 754. A synthesizer 753 generates the local signal for direct down conversion which happens in the down conversion mixer 762. A direct down conversion receiver is shown in FIG. 7, but a receiver may also be implemented with an intermediate frequency architecture, which is presented in FIG. 23. The variable gain amplifier 761 is a low noise amplifier (LNA) and the baseband filter 763 is a channel filter operating in the analog domain. The output of the A/D converter 764 is linked within the DSP 754 via an adjustable Finite Impulse Response (FIR) filter 770, an FFT block 765 and a bit detection block 766 to a decoding block 767. The DSP 754 further comprises an RSSI determination block 768. The outputs of the A/D converter 764 and of the FFT block 765 can be linked in addition to the input of the RSSI determination block 768, which controls the variable amplifier 761.

Compared to the conventional system of FIG. 1, the digital FIR filter 770 has thus been added.

Further, the components of the OFDM receiver 650 are adjustable to a larger extent than the components of the OFDM receiver 150. FIG. 7 illustrates the flow of control signals from the GSM transceiver 610 to the OFDM receiver 650 via the controller 641. As becomes apparent, information is provided by the DSP 714 of the GSM transceiver, and control signals are applied to a respective control signal input of the variable amplifier 761, of the adjustable baseband filter 763, of the adjustable A/D converter 764, of the adjustable FIR 770, of the adjustable FFT block 765, of the adjustable bit detection block 766 and of the adjustable decoding block 767.

The adjustable baseband filter 763 is more specifically a notch filter of which the notch can be adjusted. It can be implemented in various ways, some of which will be presented in the following with reference to FIGS. 8 to 19.

The DSP 754 includes the actual received signal digital processing and an analysis of the detected signal. This analysis may include the analysis of the signal quality, for example a determination of the bit-error-rate or the interfering signal detection/analysis. The interfering signal detection may include an analysis at which frequency the interfering signal is coming in, a determination of the power level of the interference, a determination of the timing of the interference, a determination of the band width of the interference, etc.

The band width detection may be used for analyzing the number of impacted sub-carriers.

Both DSPs 714 and 754 can be implemented by a specific signal processing circuitry or with any programmable processor unit.

Figure 8:
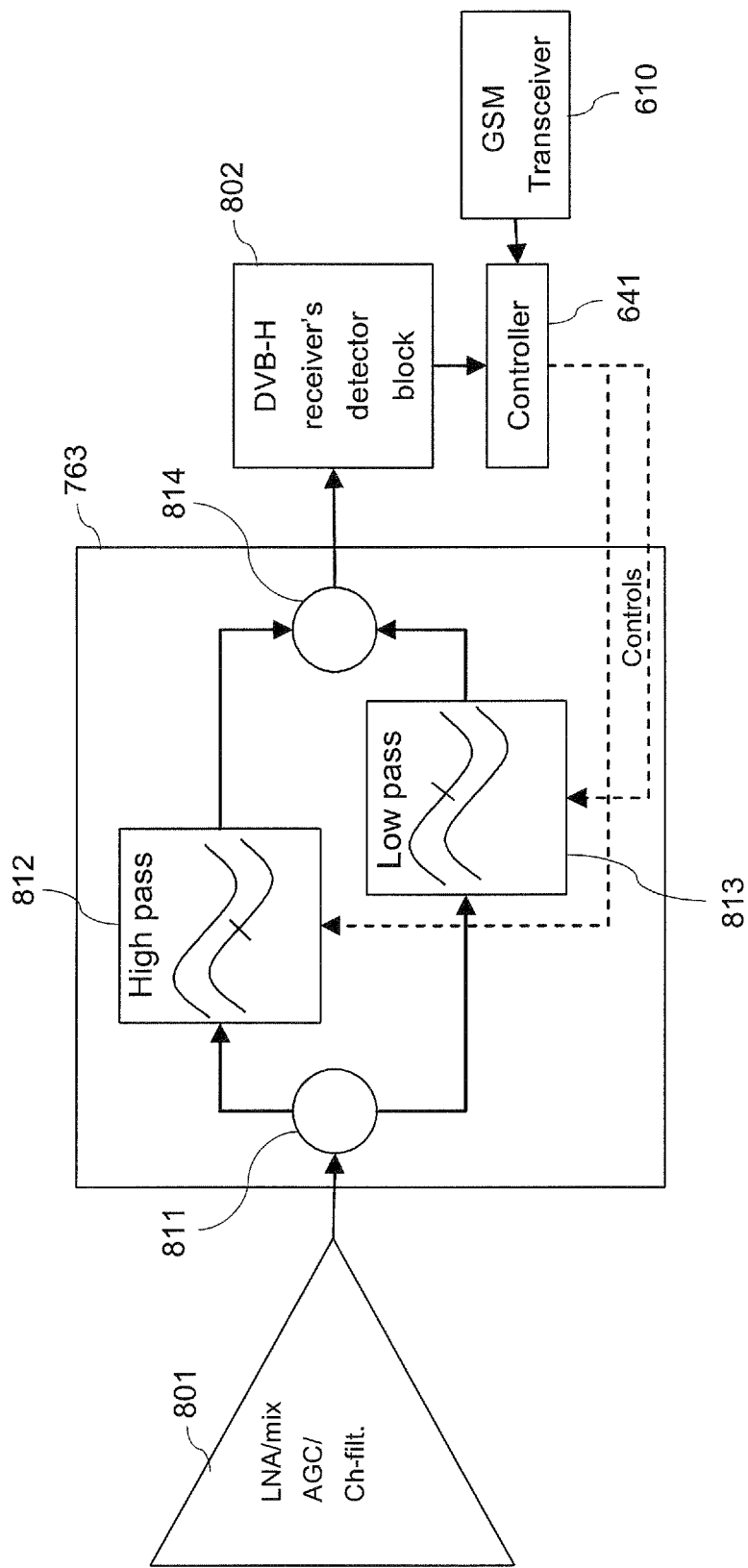
FIG. 8 is a schematic block diagram of a first type of a notch filter that may be employed in the OFDM receiver of FIG. 6.

FIG. 8 is a schematic block diagram illustrating a first variable notch filter implementation. The components of the OFDM receiver 650 preceding the notch filter 763 are summarized in block 801, while the components of the OFDM receiver 650 following upon the notch filter 763 are summarized in block 802. Further indicated are the controller 641 and the GSM transceiver 610.

The notch filter 763 comprises a splitting element 811, which receives a signal from preceding processing components 801. The splitting element 811 provides this signal on the one hand to a high pass filter 812 and on the other hand to a low pass filter 813. The outputs of high pass filter 812 and low pass filter 813 are combined by combining element 814 and provided to the subsequent processing components 802.

The controller 641 has a controlling access to the high pass filter 812 and to the low pass filter 813. It receives information from the GSM transceiver 610 and possibly in addition from block 802 of the DVB-H receiver 650. The DSP 754 of the DVB-H receiver 650 may inform the controller 641 for instance, which radio channel is currently to be received by the DVB-H receiver 650. The controller 641 may adjust more specifically the range of a pass section of the notch filter 763, as illustrated in FIG. 9.

Figure 9:
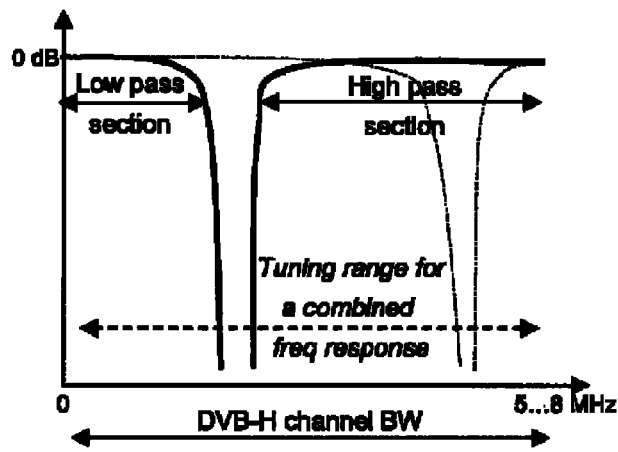
FIG. 9 is a diagram illustrating the adjustable notch filtering that is achieved with the notch filter of FIG. 8.

FIG. 9 is a diagram showing an exemplary combined frequency response of the low pass filter 812 and the high pass filter 813 for a DVB-H channel bandwidth of 0 to 5...8 MHz, since a current version of the DVB-H specification specifies supported radio channel bandwidths of 5, 6, 7 or 8 MHz.

A currently set low pass section of low pass filter 813 and a currently set high pass section of high pass filter 812 are indicated by solid lines, resulting in a first notch between both sections. The notch can be shifted by shifting both the low pass section and the high pass section, as indicated by dotted lines. Moreover, the tuning range for the combined frequency response is indicated. It can be seen that the notch can be shifted basically to any frequency within the DVB-H channel bandwidth.

Figure 10:
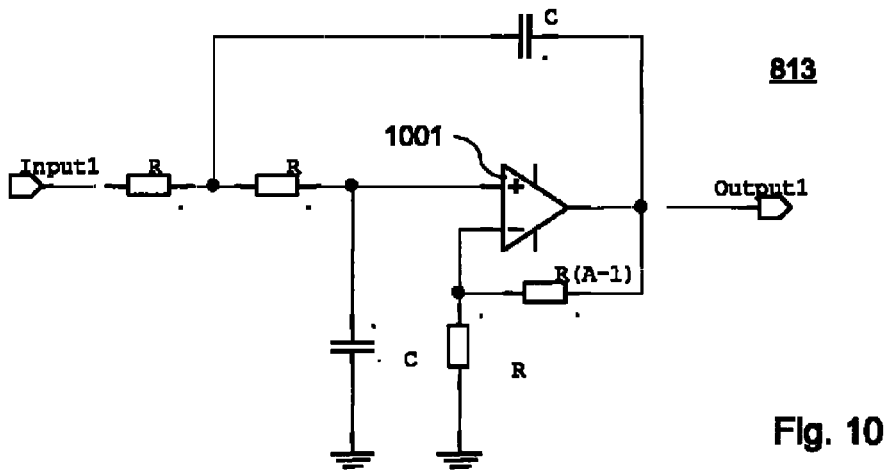
FIG. 10 is a schematic circuit diagram of an exemplary basic low pass filter for the notch filter of FIG. 8.

The low pass filter 813 can be constructed for instance as presented in the circuit diagram of FIG. 10. In this embodiment, the input of the low pass filter 813 is connected via a first resistor having a value of R and a second resistor having a value of R to a non-inverting input of an operational amplifier 1001. The output of the operational amplifier 1001 is at the same time the output of the low pass filter 813. The connection point between the first resistor of value R and the second resistor of value R is further connected via a first capacitor having a value of C to the output of the operational amplifier 1001. The non-inverting input of the operational amplifier 1001 is moreover connected via a second capacitor having a value of C to ground. The inverting input of the operational amplifier 1001 is connected on the one hand via a third resistor having a value of R to ground and on the other hand via a fourth resistor having a value of R(A-1) to the output of the operational amplifier 1001. The value A represents the linear gain of the operational amplifier, and the value R(A-1) defines the feedback loop resistor value.

The cut-off frequency of the low pass filter 813 can be adjusted in a known manner by changing the value of at least one of the first resistor, the second resistor, the first capacitor and the second capacitor.

Figure 11:
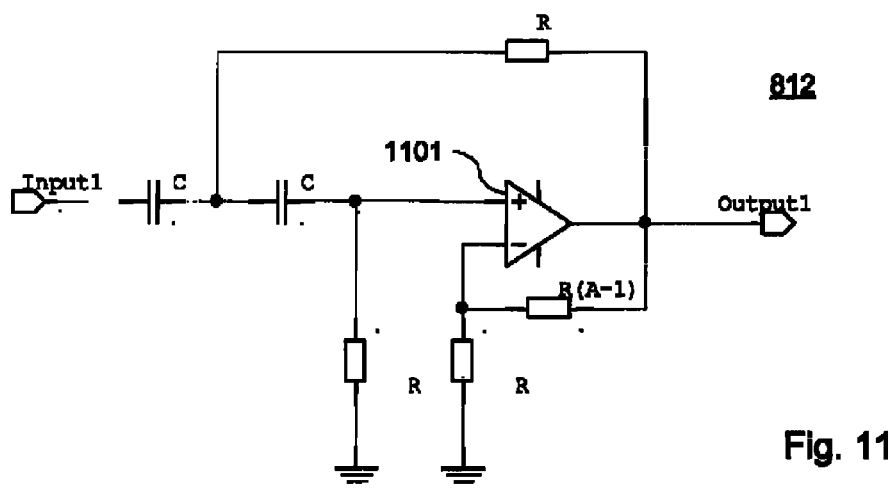
FIG. 11 is a schematic circuit diagram of an exemplary basic high pass filter for the notch filter of FIG. 8.

The high pass filter 812 can be constructed for instance as presented in the circuit diagram of FIG. 11. The input of the high pass filter 812 is connected via a first capacitor having a value of C and a second capacitor having a value of C to a non-inverting input of an operational amplifier 1101. The output of the operational amplifier 1101 is at the same time the output of the filter 812. The connection point between the first capacitor of value C and the second capacitor of value C is further connected via a first resistor having a value of R to the output of the operational amplifier 1101. The non-inverting input of the operational amplifier 1101 is moreover connected via a second resistor having a value of R to ground. The inverting input of the operational amplifier 1101 is connected on the one hand via a third resistor having a value of R to ground and on the other hand via a fourth resistor having a value of R(A-1) to the output of the operational amplifier 1101. The value A represents the linear gain of the operational amplifier 1101, and the value R(A-1) defines the feedback loop resistor value.

The cut-off frequency of the high pass filter 812 can be adjusted in a known manner by changing the value of at least one of the first resistor, the second resistor, the first capacitor and the second capacitor.

Figures 12, 13:
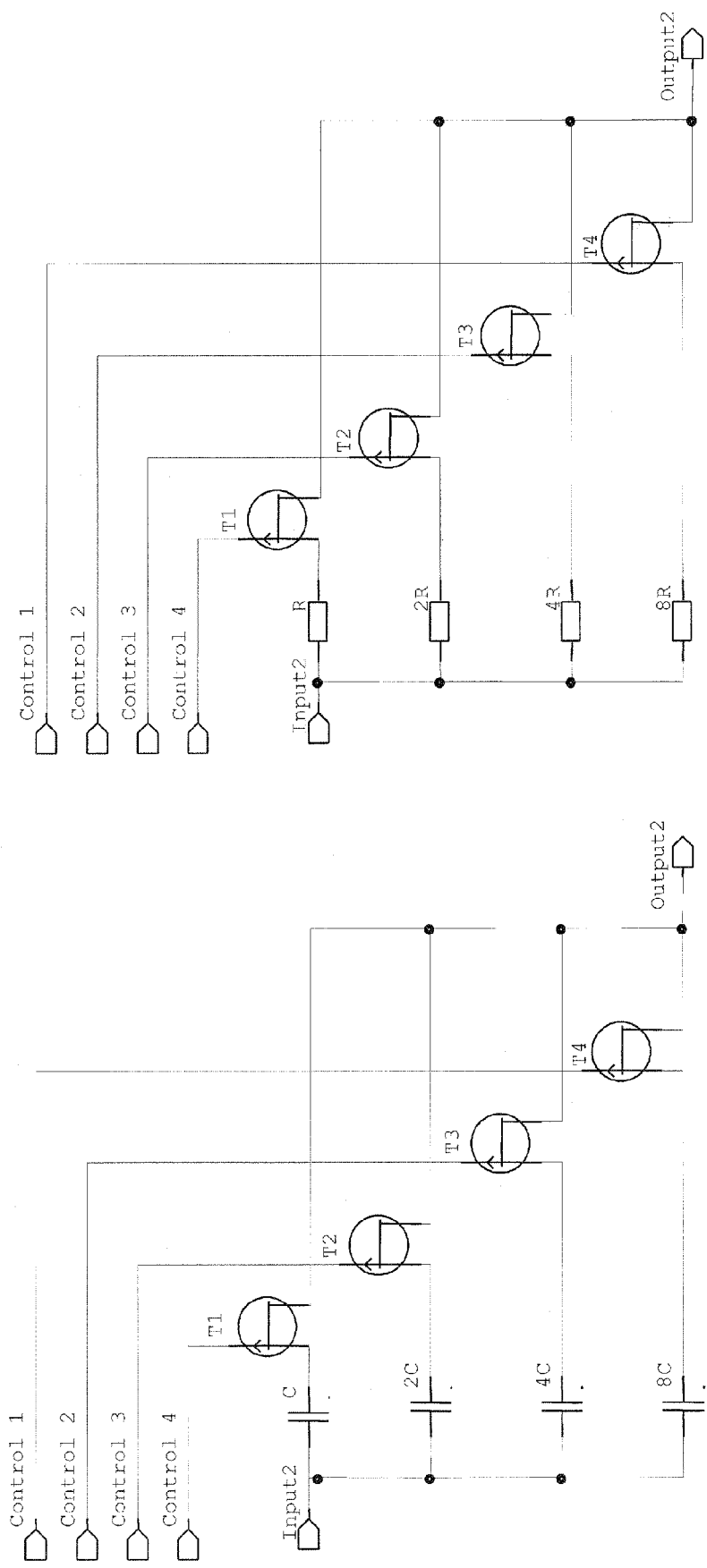
FIG. 12 is a schematic circuit diagram of an exemplary basic switchable capacitor employed for adjusting the notch filter of FIG. 8.
FIG. 13 is a schematic circuit diagram of an exemplary basic switchable resistor employed for adjusting the notch filter of FIG. 8.

An exemplary adjustable capacitor is depicted in FIG. 12. A first feed point of the adjustable capacitor is connected via a first capacitor having a value of C and a first transistor T1 to a second feed point of the adjustable capacitor. The first feed point is connected in parallel via a second capacitor having a value of 2C and a second transistor T2 to the second feed point. The first feed point is connected in parallel via a third capacitor having a value of 4C and a third transistor T3 to the second feed point. The first feed point is finally connected in parallel via a fourth capacitor having a value of 8C and a fourth transistor T4 to the second feed point. The total capacitance of the adjustable capacitor between the first feed point and the second feed point can be adjusted by switching the transistors T1-T4 separately on or off by means of a respective control signal. The adjustable capacitor obtains a total capacitance of C, for example, if only transistor T1 is switched on.

An exemplary adjustable resistor is depicted in FIG. 13. A first feed point is connected via a first resistor having a value of R and a first transistor T1 to a second feed point. The first feed point is connected in parallel via a second resistor having a value of 2R and a second transistor T2 to the second feed point. The first feed point is connected in parallel via a third resistor having a value of 4R and a third transistor T3 to the second feed point. The first feed point is finally connected in parallel via a fourth resistor having a value of 8R and a fourth transistor T4 to the second feed point. The total resistance of the adjustable resistor between the first feed point and the second feed point is adjusted by switching the transistors T1-T4 on or off by means of a respective control signal. The adjustable resistor obtains a total resistance of R, for example, if only transistor T1 is switched on.

Figure 14:
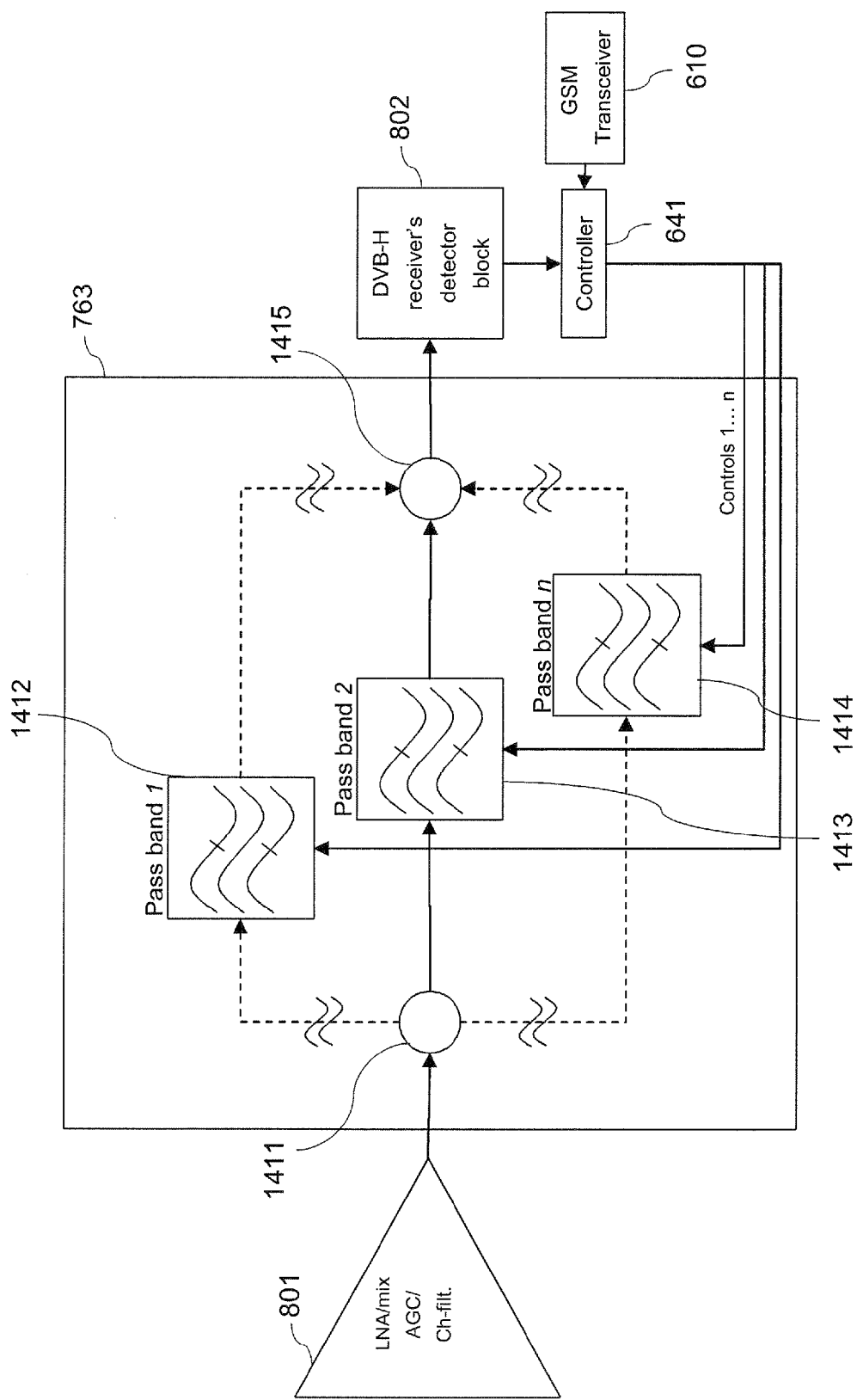
FIG. 14 is a schematic block diagram of a second type of a notch filter that may be employed in the OFDM receiver of FIG. 6.

FIG. 14 is a schematic block diagram illustrating a second variable notch filter implementation. The components of the OFDM receiver 650 preceding the notch filter 763 are summarized again in block 801, while the components of the OFDM receiver 650 following upon the notch filter 763 are summarized again in block 802. Further indicated are the controller 641 and the GSM transceiver 610.

The notch filter 763 comprises a splitting element 1411 which receives a signal from preceding processing components 801. The splitting element 1411 provides this signal in parallel to n pass band filters, of which a first pass band filter 1412, a second pass band filter 1413 and an $n^{th}$ pass band filter 1414 are depicted, n being an integer number greater than 1. The outputs of pass band filters 1412 through 1414 are combined by combining element 1415 and provided to the subsequent processing components 802.

The controller 641 has a controlling access to each of the pass band filters 1412-1414. It receives information from the GSM transceiver 610 and possibly in addition from block 802 of the DVB-H receiver 650. More specifically, the controller 641 may separately enable or disable any of the pass band filters 1412-1414 by a respective control signal, as illustrated in FIG. 15.

Figure 15:
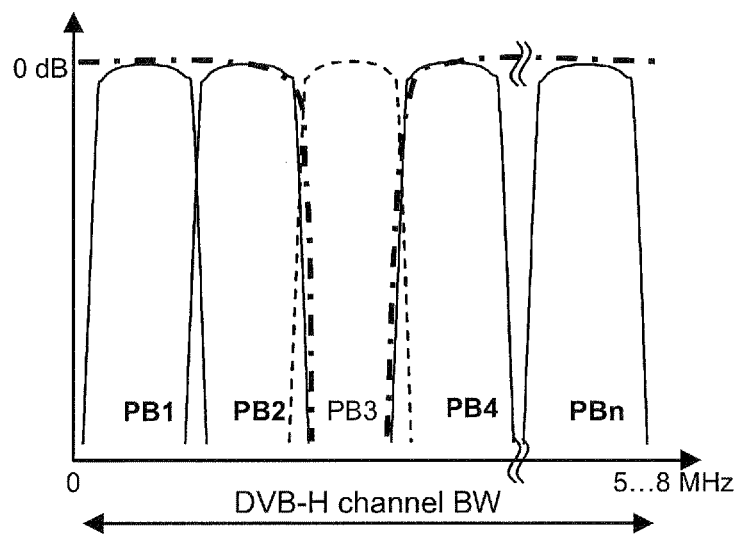
FIG. 15 is a diagram illustrating the adjustable notch filtering that is achieved with the notch filter of FIG. 14.

FIG. 15 is a diagram showing an exemplary combined frequency response of the pass band filters 1412 through 1414 for the DVB-H channel bandwidth of 0-5 . . . 8 MHz. Each pass band filter 1412 through 1414 allows the input signal to pass in a respective pass band PB1 to PBn. The pass bands PB1 to PBn are adjacent to each other and slightly overlapping. In the presented example, all pass band filters 1412 through 1414 are enabled, which is indicated in FIG. 15 by pass bands PB1 to PBn drawn with solid lines. Only the third pass band filter is disabled, which is indicated in FIG. 15 by a third pass band PB3 drawn with a dashed line. Thus, the notch is placed basically to the frequency range of the third pass band filter. The resulting combined frequency response is drawn with dot-and-dash lines.

Figure 16:
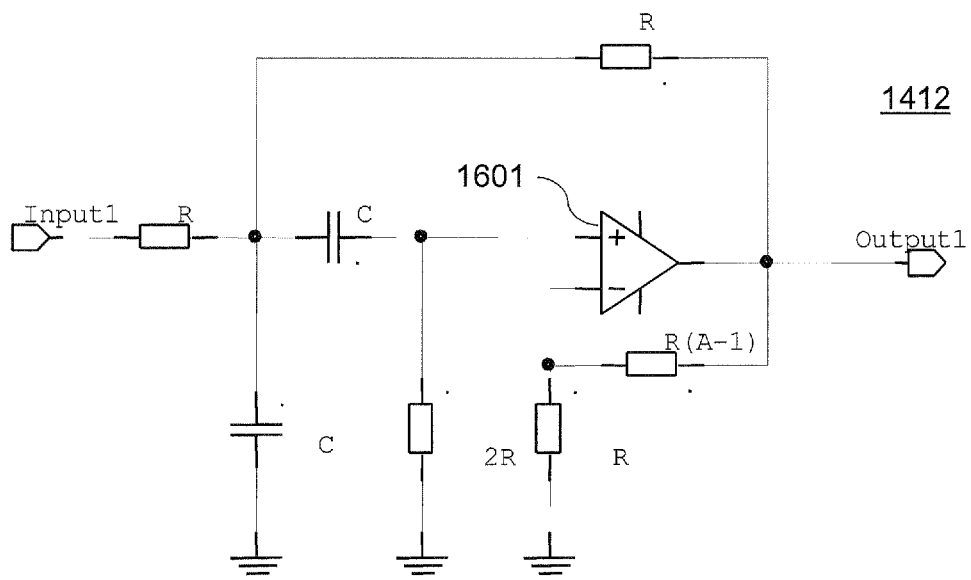
FIG. 16 is a schematic circuit diagram of an exemplary basic pass band filter for the notch filter of FIG. 14.

Each pass band filter 1412 through 1414 can be constructed for instance as presented in the circuit diagram of FIG. 16. In this embodiment, the input of the pass band filter 1412-1414 is connected via a first resistor having a value of R and a first capacitor having a value of C to a non-inverting input of an operational amplifier 1601. The output of the operational amplifier 1601 is at the same time the output of the pass band filter 1412-1414. The connection point between the first resistor of value R and the first capacitor of value C is further connected via a second resistor having a value of R to the output of the operational amplifier 1601 and via a second capacitor having a value of C to ground. The non-inverting input of the operational amplifier 1601 is moreover connected via a third resistor having a value of 2R to ground. The inverting input of the operational amplifier 1601 is connected on the one hand via a fourth resistor having a value of R to ground and on the other hand via a fifth resistor having a value of R(A-1) to the output of the operational amplifier 1601. The value A represents the linear gain of the operational amplifier 1601, and the value R(A-1) defines the feedback loop resistor value.

Figure 17:
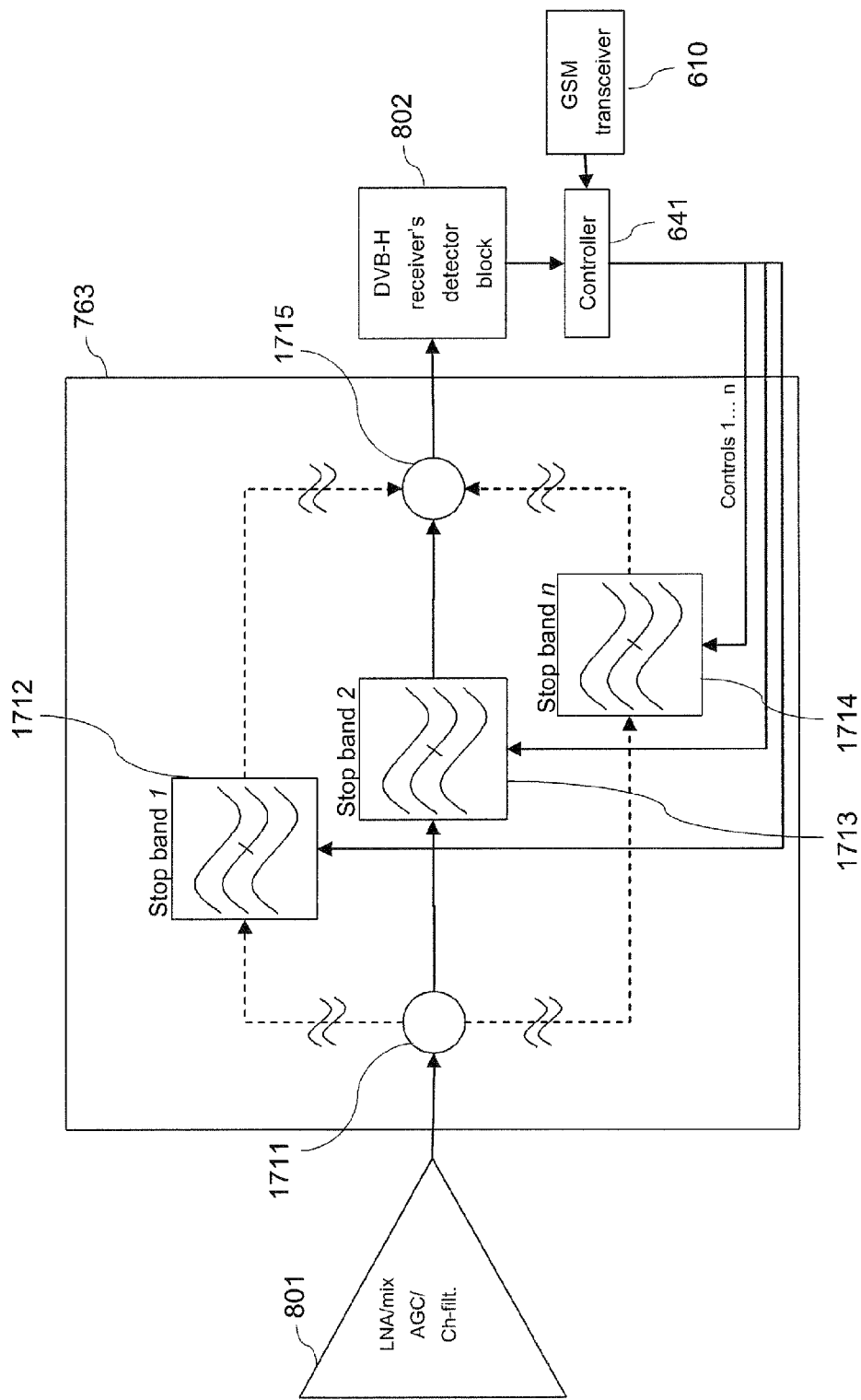
FIG. 17 is a schematic block diagram of a third type of a notch filter that may be employed in the OFDM receiver of FIG. 6.

FIG. 17 is a schematic block diagram illustrating a third variable notch filter implementation. The components of the OFDM receiver 650 preceding the notch filter 763 are summarized again in block 801, while the components of the OFDM receiver 650 following upon the notch filter 763 are summarized again in block 802. Further indicated are the controller 641 and the GSM transceiver 610.

The notch filter 763 comprises a splitting element 1711, which receives a signal from preceding processing components 801. The splitting element 1711 provides this signal in parallel to n stop band filters, of which a first stop band filter 1712, a second stop band filter 1713 and an $n^{th}$ stop band filter 1714 are depicted, n being an integer number greater than one. The outputs of stop band filters 1712 through 1714 are combined by combining element 1715 and provided to the subsequent processing components 802.

The controller 641 has a controlling access to each of the stop band filters 1712-1714. It receives information from the GSM transceiver 610 and possibly in addition from the DVB-H detector block 802. More specifically, the controller 641 may separately enable one of the stop band filters 1712 through 1714 and disable all other stop band filters 1712 through 1714 by a respective control signal, as illustrated in FIG. 18.

Figure 18:
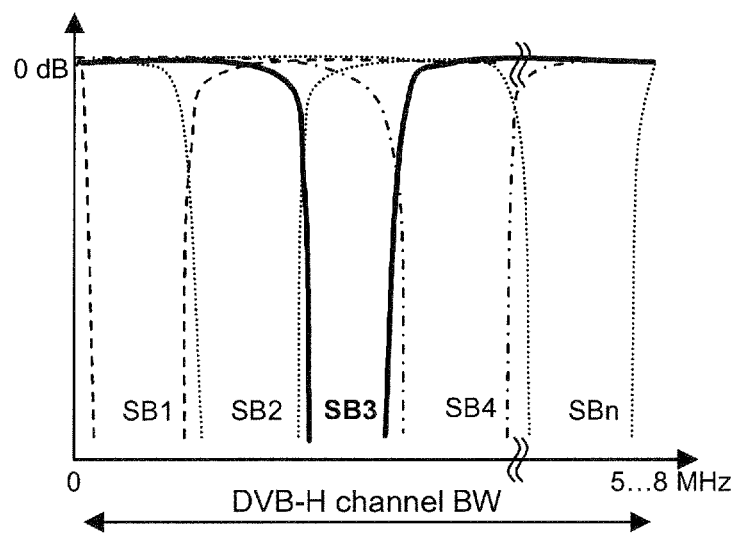
FIG. 18 is a diagram illustrating the adjustable notch filtering that is achieved with the notch filter of FIG. 17.

FIG. 18 is a diagram showing an exemplary combined frequency response of the stop band filters 1712 through 1714 for the DVB-H channel bandwidth of 0 to 5 . . . 8 MHz.

Each stop band filter 1712 through 1714 blocks the input signal in a limited frequency range, namely in stop band SB1 through SBn, respectively. The blockable frequency ranges SB1 through SBn are arranged adjacent to each other. In the presented example, all stop band filters 1712 through 1714 are disabled, as indicated by a respective pair of dotted lines, dashed lines and dot-and-dash lines that are associated to stop bands SB1 through SBn. Only the third stop band filter is enabled, as indicated by a solid line that is associated to stop band SB3. Thus, the combined frequency response corresponds to the frequency response of the third stop band filter, and the notch is placed to the blocking frequency range SB3 of this third stop band filter.

Figure 19:
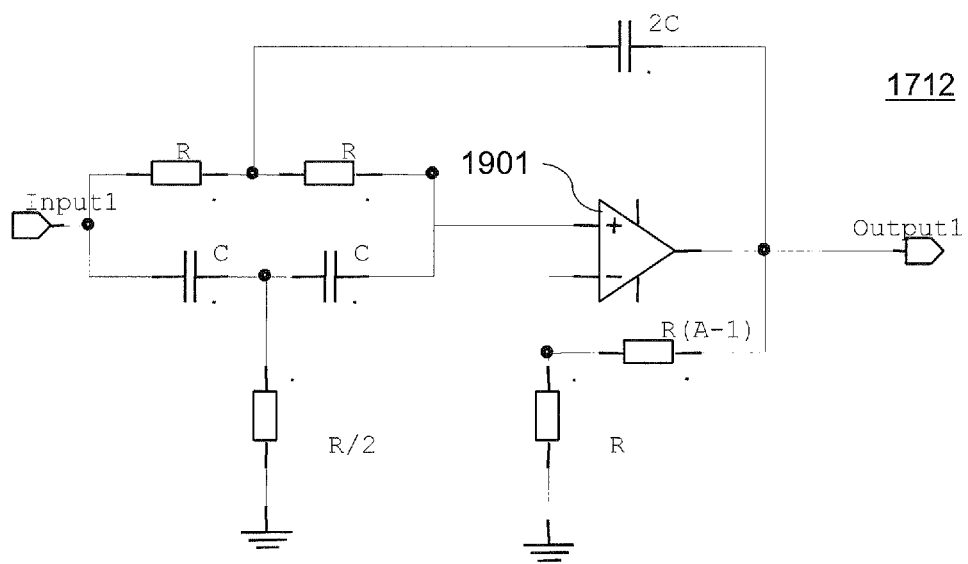
FIG. 19 is a schematic circuit diagram of an exemplary basic stop band filter for the notch filter of FIG. 17.

Each stop band filter 1712 through 1714 can be constructed for instance as presented in the circuit diagram of FIG. 19. The input of the pass band filter 1712-1714 is connected via a first resistor having a value of R and a second resistor having a value of R to a non-inverting input of an operational amplifier 1901. The input of the pass band filter 1712-1714 is connected in parallel via a first capacitor having a value of C and a second capacitor having a value of C to the non-inverting input of the operational amplifier 1901. The output of the operational amplifier 1901 is at the same time the output of the filter 1712-1714. The connection point between the first resistor of value R and the second resistor of value R is further connected via a third capacitor having a value of 2C to the output of the operational amplifier 1901. The connection point between the first capacitor of value C and the second capacitor of value C is further connected via a third resistor having a value of R/2 to ground. The inverting input of the operational amplifier 1901 is connected on the one hand via a fourth resistor having a value of R to ground and on the other hand via a fifth resistor having a value of R(A-1) to the output of the operational amplifier 1901. The value A represents the linear gain of the operational amplifier 1901, and the value R(A-1) defines the feedback loop resistor value.

When the GSM transceiver 610 is to transmit data, the data is encoded by coding block 737. The coded data is converted into a bit representation by bit generation block 736. The generated bits are converted into the analog domain by D/A converter 734. The resulting analog signal is filtered by baseband filter 733. The filtered signal is upconverted to radio frequency by mixer 732 making use of the signal from local oscillator 713. The generated RF signal is amplified by amplifier 731 and forwarded via duplexer 712 to antenna 711 for transmission via the air interface. This process corresponds to a conventional GSM transmission.

In parallel, however, information about the transmission is provided to the controller 641. More specifically, information about the employed RF frequency band, information about the employed power level and information about the timing of the transmission is provided to the interfering signals detector 645.

The OFDM receiver 650 receives an OFDM signal in a selected RF channel via antenna 751. The signal is amplified by the variable amplifier 761 and downconverted to a baseband signal by mixer 762. The mixer 762 makes use to this end of an RF signal provided by the synthesizer 753. The baseband signal is filtered by baseband filter 763 and converted into a corresponding digital signal by A/D converter 764. The digital signal is processed by the FIR filter 770 and transformed to the frequency-domain by the FFT block 765. The bit detection block 766 then regains the bits from the N used sub-carriers. The bits for each sub-carrier are provided to the decoding block 767, which decodes the N bitstreams to regain the original data. The data can then be used for instance for presentation to a user via the user interface 680.

As indicated above, variable amplifier 761, baseband filter 763, A/D converter 764, FIR filter 770, FFT block 765, bit detection block 766 and decoding block 767 operate under control of the controller 641.

The adjustment of the OFDM receiver 650 by the controller 641 according to an embodiment of the invention will now be described with reference to the flow chart of FIG. 20.

The interfering signals detector 645 receives from the GSM transceiver 610 information on a fundamental frequency which is also called the first harmonic of transmission (2001) and determines based on this information the frequency of the harmonics that are caused by the transmission (step 2002). The harmonics can be obtained for instance by means of a predefined mapping table.

In case there are several interfering components 610, 611, 612, the interference signals detector block 645 receives information from each of these components (step 2001) and combines the information of the interfering signal frequencies from components 610, 611 and 612. It could receive for instance information on a fundamental frequency from a GSM transceiver 610 and information on a fundamental frequency from a Bluetooth™ transceiver 611. Based on the received information, the interference signals detector block 645 may determined the frequency of the harmonics for one or more of these components 610, 611, 612 and in addition, it may calculate mixing products or inter-modulation products of the signals that are caused by the transmissions of two or more of these components 610, 611, 612 (step 2002).

When there are multiple frequency signals in non-linear components, inter-modulation product signals will be generated. The inter-modulation products of the signals can be calculated more specifically by subtracting and adding harmonic frequencies of different frequencies. The mixing of the two sinusoidal signals can be presented in accordance with the following equations:

$$v_1 = A_1 \sin(2\pi f_1 t) \text{ and } v_2 = A_2 \sin(2\pi f_1 t), \text{ where}$$

$v_1, v_2$: represent the two varying voltages
$A_1, A_2$ represent the amplitudes of the signals
$f_1, f_2$ represent the two frequencies in hertz and
t represents time.

An exemplary non-linear component that might cause harmonics and inter-modulation products could be for instance some diode. The output of such a diode can be expressed with following equation:

$$I = I_S \left( e^{\frac{qV_D}{nkT}} - 1 \right),$$

That can be expanded with the Taylor series:

$$e^x = 1 + x + \frac{x^2}{2!} + \frac{x^3}{3!} + \frac{x^4}{4!} + \dots$$

When this Taylor expansion is applied to the input signal, which is a sum or subtraction of signals v1 and v2, an output signal v0 can be seen:

$$v_o = 1 + (v_1 + v_2) + \frac{(v_1 + v_2)^2}{2!} + \frac{(v_1 + v_2)^3}{3!} + \dots$$

These terms represent:
1, a DC shift
The original two signals v1 and v2
A square-law signal, which contain frequencies $f_1$, $f_2$, $2f_1$, $2f_2$, $f_1+f_2$ and $f_1-f_2$
Signals equivalent to the cube. These signals frequencies are
$f_1,f_2,2f_1,2f_2,3f_1,3f_2,2f_1+f_2,f_1+2f_2,2f_1-f_2,f_1-2f_2,f_1-2f_2$,
and higher powers.

The previous can be expressed with a sorter format equation $$\text{Freq(mixing)} = (+/-)n*\text{freq1} + (+/-)m*\text{freq2}.$$

In this equation, freq1 is a first fundamental harmonic frequency, freq2 is a second fundamental harmonic frequency, and m and n are integer values, that is, m,n∈0, 1, 2, 3, . . . . The equation is valid for two an inter-modulation product that is based on two original frequencies. The actual source of the both the first and the second fundamental frequency may be a same component or both signals may be generated in separate components.

For N signals, inter-modulation product frequencies can be determined according to the previously presented equations by adding the input signal by signals which contains several frequencies for example freq#1, freg#2, . . . freq#N.

$$Freq(\text{mixing}) = \\ (+/-)n*freq\#1 + (+/-)m*freq\#2 + \dots + (+/-)x*freq\#N.$$

In this equation, freq#1 is a first fundamental harmonic frequency and freq#2 is a second fundamental harmonic frequency. Other fundamental harmonic frequencies are present up to an Nth frequency freq#N. Further, m, n and x are integer values, that is, m,n,x∈0, 1, 2, 3, . . . . The source of the interfering signals freq#1, freq#2 . . . freq#N may be one component or those may be generated by multiple components.

In previous equation the fundamental frequency freq#N may be also an inter-modulation product of the fundamental frequencies freq#1 and freq#2. Thus the inter-modulation product frequencies may also act like a fundamental frequency and generate new interference frequencies. The number of the inter-modulation frequencies will be very high when there are multiple frequencies at place and inter-modulations are generated by high order non-linearities.

In previous discussion is presented only inter-modulations which are generated only in one active non-linear block. In typical receiver there are multiple non-linear blocks connected to each other and thus previous block inter-modulation results will be fundamental frequencies for the next block. This will yield to a difficult interference problem, which will be difficult to solve.

The frequencies of the inter-modulation products can be calculated whenever needed, but the inter-modulation product frequencies may also be already stored to a look-up table to avoid extra calculation.

Then, the interfering signals detector 645 determines whether the first harmonic or higher order harmonics fall into or next to the OFDM frequency band and will thus cause interference (step 2003). The interfering signals detector 645 also determines the power level that is expected for a respective harmonic, as will be described further below with reference to FIG. 22. The interfering signals detector 645 also determines the power levels that are expected for inter-modulation products.

The interference detector 645 may weight the incoming information of components 610, 611, 612 with different weights. This means that for example the information 610 is more important since the expected interference level is higher than from other components 611, 612. Thus the timing information from component 610 is used for indicating when the interference is present.

In case no impending interference is detected, the interfering signals detector 645 waits for information on a next transmission by component 610, 611 or 612 (step 2001).

In case impending interference is detected, the interfering signals detector 645 instructs the OFDM receiver adjuster 643 to perform suitable adjustments of the OFDM receiver 610.

As a first adjustment 1), which is also indicated in FIG. 7, the OFDM receiver adjuster 643 adjusts the characteristics of the antenna tuning circuitry 780 which is connected to antenna 751. The antenna tuning circuitry 780 can be tuned to another frequency when interfering transmission is detected by interfering signals detector 645.

The tuning of the active antenna tuning circuitry 780 can be done by changing one component value or several components values of the tuning circuitry 780. The resonance circuitry comprises typically several inductance and capacitance components connected either in serial or parallel manner.

For example, a PIN-diode capacitance can be changed by changing the control voltage of the diode. The capacitance change will change the total circuitry resonance frequency and when this circuitry is connected to antenna 751, the antenna resonance is changed.

An alternative method of changing the antenna resonance frequency is to either connect or disconnect some components from the circuitry 780. The capacitance and inductance components can be implemented with actual components or with transmission lines.

The actual antenna resonance may be shifted to a higher or a lower frequency depending on the interfering signals frequencies. When the antenna resonance is tuned away from the interfering frequency then antenna isolation is improved, which will result in a more effective filtering for the harmonic or inter-modulation interference. The antenna de-tuning can be done to minimize the inference signal immigration to receiver 650 from out-side of the typical reception band and thus improve the blocking performance of the receiver 650.

As a second adjustment 2), which is also indicated in FIG. 7, the OFDM receiver adjuster 643 adjusts the gain of the variable amplifier 761 (step 2004).

In conventional systems, only the RSSI determined by RSSI block 768 is used as a basis for an automatic gain control (AGC) at the variable amplifier 761. In the presented embodiment of the invention, information about the expected power level of interferences within or close to the OFDM reception band is used for an additional AGC. More specifically, the information is used such that whenever high interference is expected for a given RSSI, the variable amplifier 761 is set to a lower gain stage than when low or no interference is expected. This avoids a compression of the variable amplifier 761 due to a high interference level. That is, it is prevented that the amplifier 761 goes into saturation. By preventing the override of the first stages of the OFDM receiver 650, an optimal signal reception level for the A/D converter 764 can be maintained.

As a third adjustment 3), which is also indicated in FIG. 7, the OFDM receiver adjuster 643 adjusts the characteristics of the baseband filter 763.

Figure 20:
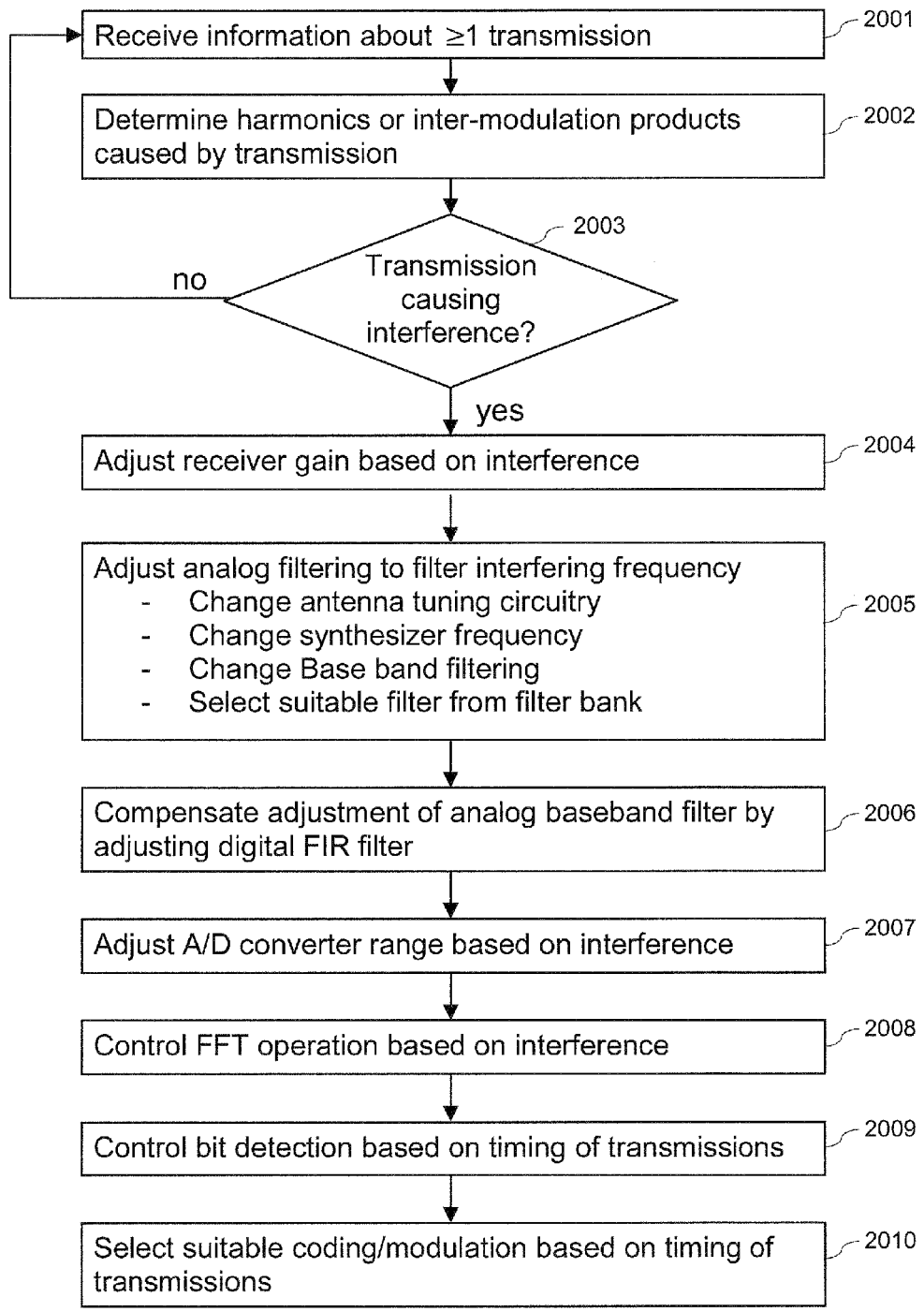
FIG. 20 is a flow chart illustrating a controlling of the OFDM receiver of FIG. 6.

The first adjustment 1) and the third adjustment 3) are summarized in FIG. 20 as step 2005, because they both adjust the analog filtering to the filter interfering frequency. A further option for such an adjustment of the analog filtering to the filter interfering frequency would be changing the frequency of the synthesizer 753.

For adjusting the characteristics of the baseband filter 763, more specifically the notch of the baseband filter 763 is adjusted by corresponding control signals such that its frequency range covers the determined frequency of the interfering harmonic or harmonics or inter-modulation products. This improves the carrier-to-noise (C/N) ratio, and as a result, the OFDM reception quality can be improved. Depending on the employed baseband filter topology, the baseband filtering is changed by adaptively changing the filter characteristics, as described above with reference to FIG. 8, or by enabling suitable filters from a filter bank, as described above with reference to FIGS. 14 and 17. It might be noted that in addition to shifting the notch to a suitable position, the OFDM receiver adjuster 643 might also be adapted to adjust the slopes of the notch by changing the filter characteristics or by selecting suitable filters from a filter bank.

As a further accompanying adjustment 3A), which is also indicated in FIG. 7, the OFDM receiver adjuster 643 adjusts the characteristics of the digital FIR filter 770 (step 2006).

Since the change of the channel filter characteristics in step 2005 will affect the reception quality by increasing an inter-symbol-interference (ISI), compensation is needed. For this reason the FIR filter 770 is included, which simply compensates the unidealities of the analog baseband filter 763 compared to a conventional channel filter. If the interference hits very near to the desired signal, then the slope of the filter 763 may be increased and this may filter more interference away. The steepness of the filter slope can be adjusted for example by changing the filter component values as described with reference to FIGS. 10, 11, 16 and 19. The filter slope or steepness is affected by how many filtering stages there are in the filter 763. The filter 763 may include multiple individual filter stages which are presented in FIG. 10, 11, 16 or 19. The filter steepness can be altered by selecting how many filtering stages actually filter the incoming signal. The component values for each of the filtering stages can be selected individually. If easy filtering is needed then some of the filtering stages can be bypassed, which will save current consumption. The extra filtering will have effect to the received signal phase which is typically expressed as a group delay. This extra filtering group delay unideality has also to be compensated by digital FIR filter 770. The unidealites can be compensated by changing the FIR filter coefficient values. These values define the amplitude and phase response of the digital filter. The digital filter response can be optimized by the OFDM receiver adjuster 643 more specifically such that the combined filter response of analog and digital filter 763, 770 is phase linear.

As a fourth adjustment 4), which is also indicated in FIG. 7, the OFDM receiver adjuster 643 adjusts the scale of the A/D converter 764 (step 2007).

A practical implementation of a notch filter 763 has always a limited filtering capability. The filtering is not ideal, since an infinite attenuation is not achieved and since a roll-off effect is included in the filter response, as will be described further below with reference to FIG. 27. As some signal will leak through the filter components at least at those frequencies at which the filtering attenuation is not too high, the signal content of the interference is not removed completely. This is in particular the case with sub-carriers in a roll-off region of the set notch. The scale optimization of the A/D converter 764 is included to take care of the leaking interfering signal.

Figure 21:
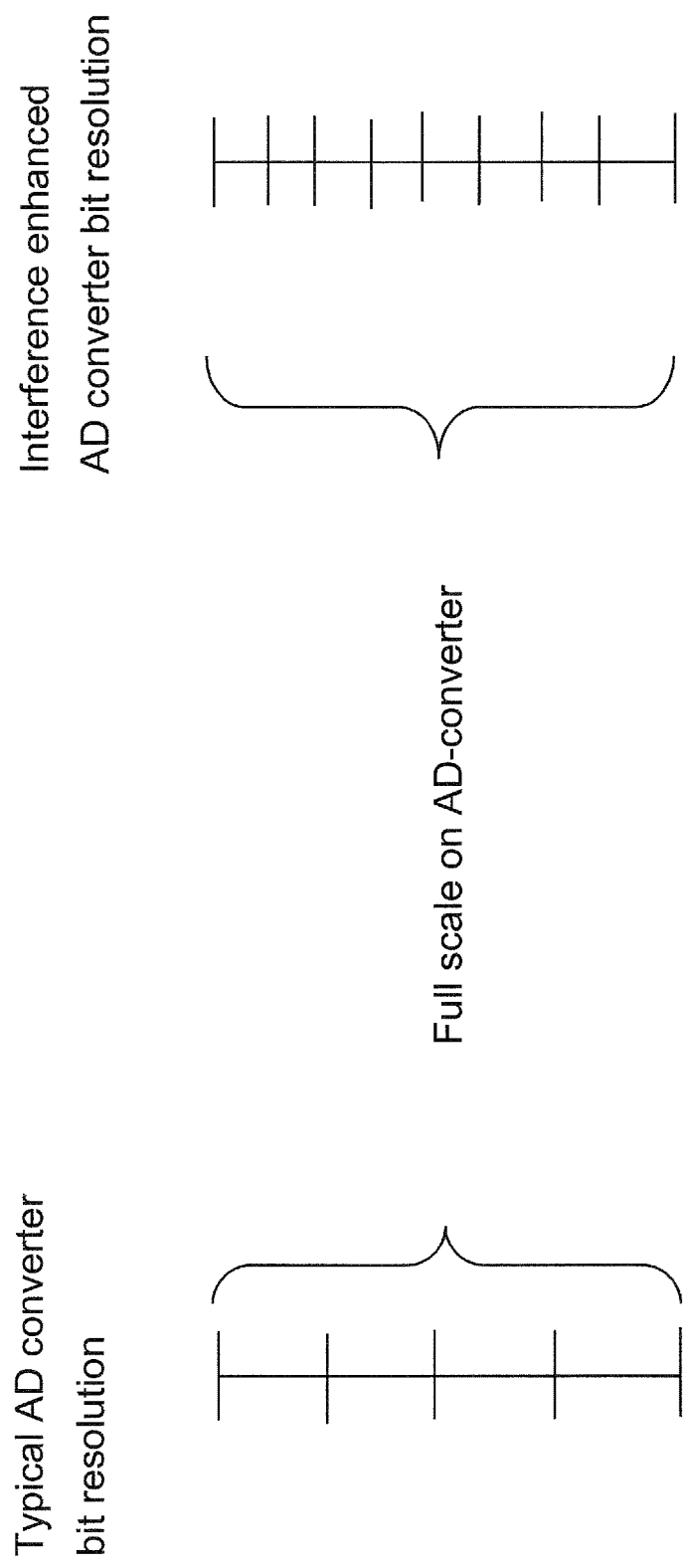
FIG. 21 is a diagram illustrating the adjustment of an A/D converter in the scope of a controlling of the OFDM receiver of FIG. 6.

The scale adjustment is illustrated in FIG. 21. In normal OFDM receiver operation, for example an effective 4 bit A/D converter quantization resolution, illustrated on the left hand side of FIG. 21, may be sufficient. When interference is present, a higher bit resolution is used, for example an effective 8 bit quantization resolution illustrated on the right hand side of FIG. 21. A higher resolution of the A/D converter 764 is achieved for example by increasing the clocking of the A/D converter 764 by a corresponding control signal. When the A/D converter 764 is used with a higher frequency in order to increase its dynamic range, also its power consumption increases. Therefore, the higher resolution is advantageously employed only when needed due to interferences.

It is to be understood that while a parallel type A/D-converter is presented in FIG. 21, the A/D-conversion can equally be carried out with a serial type A/D-converter, for instance with a sigma-delta converter. With a sigma-delta converter, the quantization resolution increase can be achieved by increasing the clocking of the A/D converter, also.

As a fifth adjustment 5), which is also indicated in FIG. 7, the OFDM receiver adjuster 643 adjusts the operation of the FFT block 765 (step 2008).

In order to make any practical digital signal processing, a certain signal-to-noise ratio is needed. As mentioned above, the realized filters are not ideal and the signal content of the interference is not removed completely. For this reason, a digital signal filtering is needed to improve the signal-to-noise ratio. This digital signal filtering is the first signal processing step before the actual FFT conversion, and it is carried out in the FFT block 765. This digital pre-filtering filter may filter the known interference at an even lower level than achieved with the analog filter. If the incoming signal signal-to-noise ratio is high enough, digital signal filtering may be by-passed.

The main idea of distributed adaptive filtering is that the baseband filter 763 performs a rough filtering in the analog domain and that the tunable filter of the FFT block 765 performs a fine tuning filtering in the digital domain. The filter 770 corrects the group delay of analog domain filter, if needed. Since the interference of the harmonic signal or the inter-modulation product is filtered by the baseband filter 763 before reaching the A/D-converter 764, the converter 764 is not overdriven by an interference signal. Thus, there is more dynamic range for the signal and for the remaining interference, which is further increased by the adjusted scale of the A/D-converter 764. Due to the enhanced resolution for signal and noise, the adaptive filtering at the digital baseband side can now be done more effectively.

A part of the digital filtering is achieved by selecting sub-carriers, which are not corrupted, or enough sub-carriers to fulfill the minimum reception data rate level. The OFDM receiver adjuster 643 calculates, which sub-carriers are corrupted by the harmonic or harmonics or inter-modulation products of the GSM transceiver 610 transmission, and informs the FFT block 765 accordingly. The sub-carriers, in which the signal is buried completely under interference, will be basically removed in the FFT block 765 in the digital filtering.

The FFT block 765 may also weight the information of corrupted sub-carriers with a lower gain that the information of non-corrupted sub-carriers. The latter approach can be used in particular for those sub-carriers that are less affected by corruption, in case information from some of the corrupted sub-carriers is needed to fulfill the minimum reception data rate level.

As a sixth adjustment 6), which is also indicated in FIG. 7, the OFDM receiver adjuster 643 adjusts the bit detection in bit detection block 766 (step 2009).

The GSM transceiver 610 informs the interfering signals detector 645 when the OFDM reception is transmission free or, if a burst mode transmission is used, when a GSM transmission will occur. The interfering signals detector 645 forwards this information to the OFDM receiver adjuster 643. The OFDM receiver adjuster 643 informs the bit detection block 766 when a GSM transceiver transmission will occur. The bit detection block 766 may then consider this information when detecting the received signal. This has been described in the above cited document WO 03/105386, to which it is referred. In response to a notification of a transmission, the bit detection block 766 may in particular terminate the bit detection for a portion of time corresponding to a duration of the GSM transceiver transmission, for instance for a portion of one bit time corresponding to a duration of a burst transmission. This adjustment can be caused in particular whenever the OFDM receiver adjuster 643 determines that the combination of frequency and interference level is so significant for a current OFDM reception that adjustments 1) to 5) in steps 2004 to 2008 will not result in a sensible bit detection.

As a seventh adjustment 7), which is also indicated in FIG. 7, the OFDM receiver adjuster 643 selects a suitable coding and modulation scheme and informs the decoding block 767 accordingly (step 2010). The OFDM receiver adjuster 643 or the decoding block 767 informs as well a component (not shown) of the OFDM receiver 650, which is responsible for providing information about the coding and modulation scheme that is to be employed to a respective OFDM transmitter.

An adaptive coding and modulation method may be supported by any bi-directional OFDM communication system. A WLAN 802.11a system supports multiple modulation method for OFDM modulation. The supported pay load modulation methods are BPSK, QPSK, 16-QAM and 64-QAM. The supported data rates are 6, 12 and 24 Mbps and optional data rates 9, 18, 36, 48 and 54 Mbps.

The OFDM receiver adjuster 643 may change the OFDM coding and modulation according the other timing cycles of the GSM transceiver 610. The OFDM coding and modulation is changed in the transmission end of the OFDM system. The need of change of system parameters need to be communicated to transmission end of the OFDM system. At least a change of the data rate could be requested this way in a bi-directional system.

The modulation could be varied for instance in a hierarchical way, for example as described by Gerard Faria, ITIS, in the document "DVB-T hierarchical modulation: an opportunity for new services?" in 1999.

The GSM transceiver 610 can communicate to the controller 641 the transmission and reception cycle. These can then be taken into account when the OFDM system is initialized by selecting a proper channel coding which is suited to stand the interference caused by the GSM transceiver 610.

It has to be noted that the OFDM receiver adjuster 643 may ensure that any of the adjustments (steps 2004-2010) is performed for the duration of respective GSM active transmission slots or for the whole GSM connection time, which may be a voice call.

The OFDM receiver adjuster 643 may send actual adjustment command signals prior the actual radio transmission, since there are delays in communication lines and in digital signal processors. When command signals are sent prior to an actual transmission, then the receiver 650 is already adjusted correctly when the actual interference will be present.

The interference level experienced at the OFDM receiver 650 due to a transmission by the GSM transceiver 610 does not depend exclusively on the transmission power level.

The interference level rather depends on the OFDM receiver reception level, the GSM transceiver transmission level and the antenna isolation between the GSM antenna 711 and the OFDM antenna 751, etc.

While OFDM receiver reception level and GSM transceiver transmission level are known in the device 600, the antenna isolation may be determined and stored once or at regular intervals.

Figure 22:
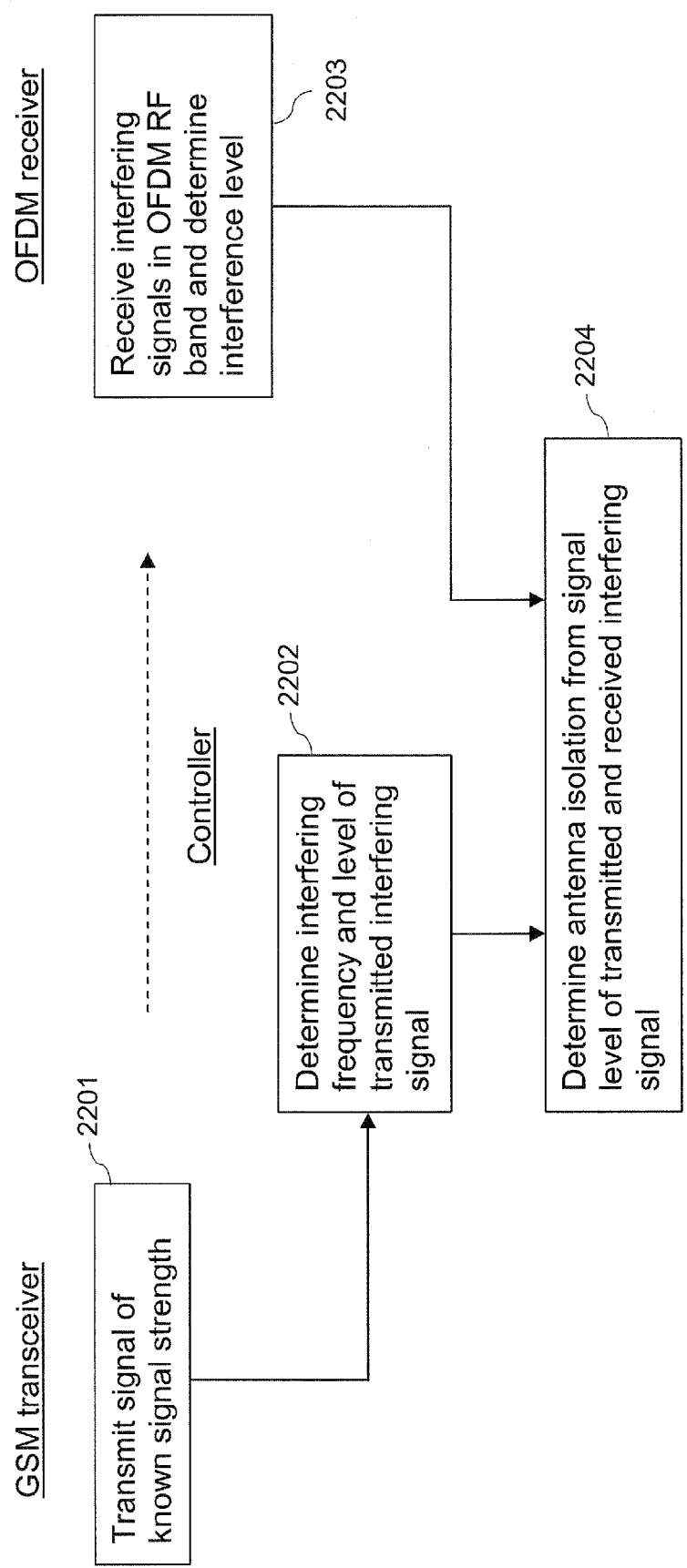
FIG. 22 is a flow chart illustrating a determination of an antenna isolation for a controlling of the OFDM receiver of FIG. 6.

A possibility of determining the antenna isolation at the controller 741 is illustrated in the flow chart of FIG. 22.

The GSM transceiver 610 transmits a signal at a first RF band and informs the controller 741 accordingly (step 2201).

The interfering signals detector 645 knows at which other RF bands this transmission may cause interferences, namely at the 1st, 2nd, 3rd, etc. harmonics or in inter-modulation products. It can also determine the power level of the transmitted interference at each harmonic or inter-modulation product based on the level of the transmitted signal in the fundamental RF band. (step 2202)

The OFDM receiver 610 measures the received interference at one of the RF bands, which are relevant for it, and informs the controller 741 accordingly (step 2203).

Based on the measured received interference and the known transmitted interference at this RF band, the interfering signals detector 645 may determine and store the antenna isolation (step 2204).

This antenna isolation can then be used to determine the power level of interferences caused by subsequent GSM transceiver transmissions, as a basis for controlling the characteristics of the OFDM receiver 650, as described above, in synchronization with the reception/transmission cycles of the GSM transceiver 610.

While the above presented embodiment performs an adjustment of the analog baseband filtering, it has to be noted that an analog filtering could also be adjusted at radio frequency or at an intermediate frequency (IF).

A tunable radio frequency filter can be realized for example with Micro Electro Mechanical Switch (MEMS) component technology.

Figure 23:
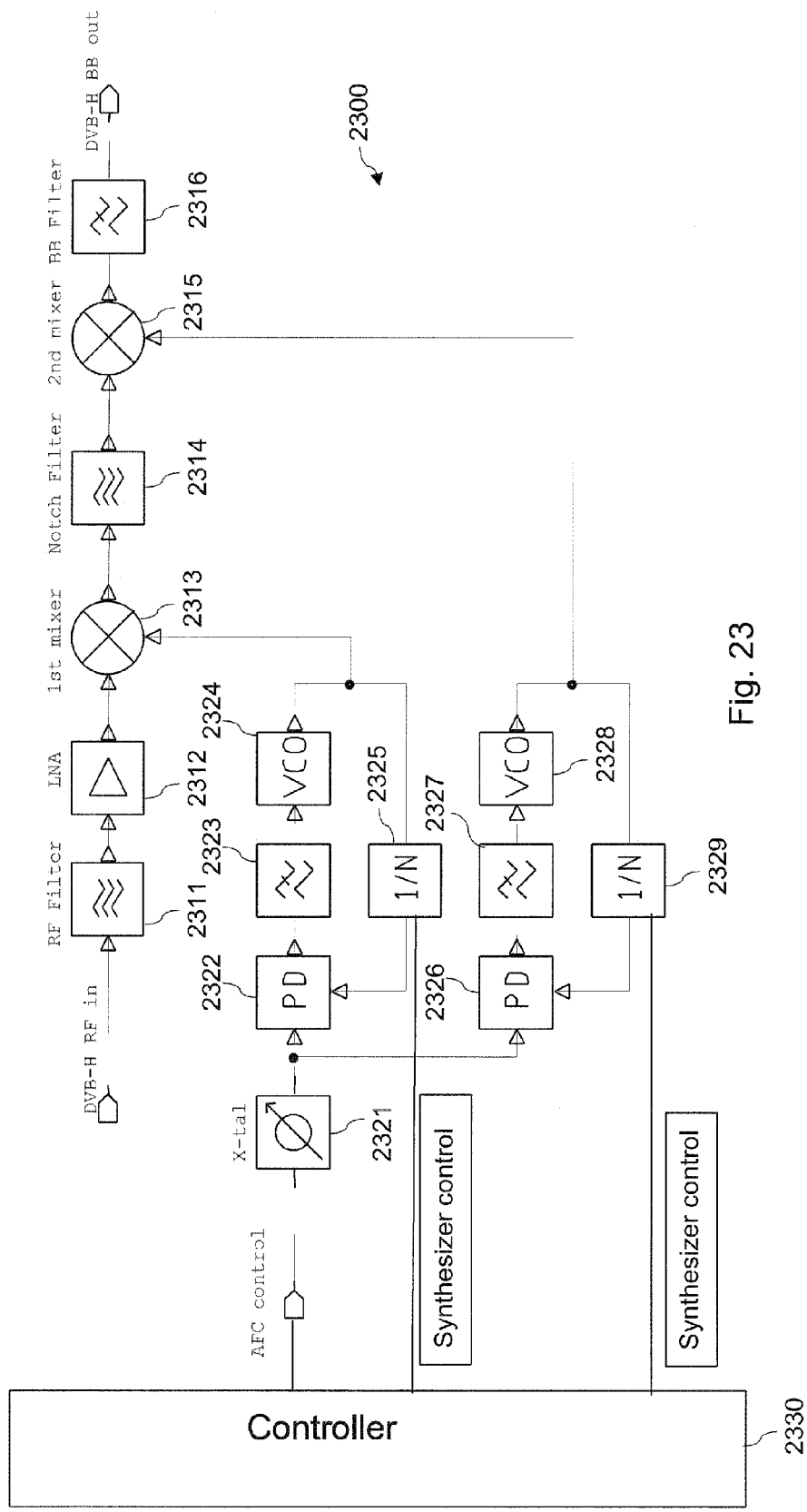
FIG. 23 is a schematic block diagram illustrating alternative details of the electronic device of FIG. 6 enabling an adjustable filtering at an intermediate frequency.
Figure 24:
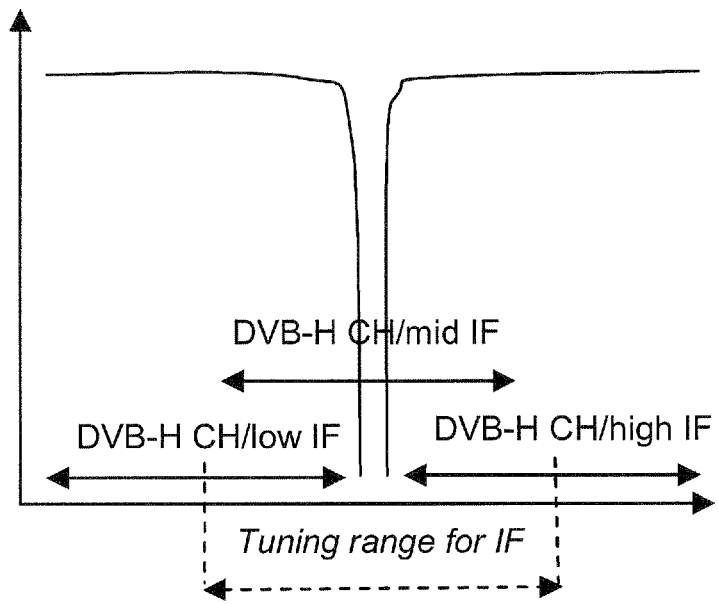
FIG. 24 is a diagram illustrating a fixed notch filtering with a variable intermediate frequency.
Figure 25:
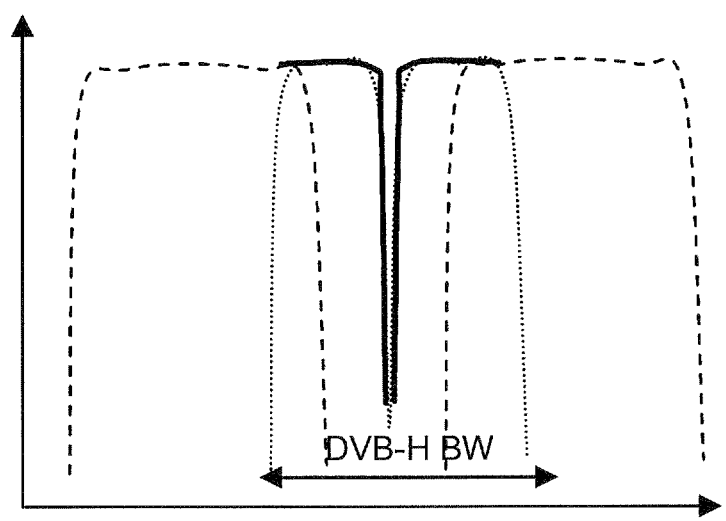
FIG. 25 is a diagram illustrating an operation at a center IF frequency.

An exemplary approach using a tunable intermediate frequency filtering is illustrated in FIGS. 23 to 25.

FIG. 23 is a schematic block diagram of the analog portion 2300 of an exemplary DVB-H receiver using an intermediate frequency in accordance with an embodiment of the invention.

An RF input signal received by an antenna (not shown) is filtered by an RF filter 2311 and amplified by a low noise amplifier 2312. The amplified signal is provided to a first mixer 2313, which downconverts the RF signal to an intermediate frequency signal. The intermediate frequency signal is then subjected to a fixed notch filter 2314. There may be a several fixed notch filters at different frequencies, which are not presented in the Figure. The filtered intermediate frequency signal is further downconverted to the baseband by a second mixer 2315. The resulting baseband signal is low pass filtered by a low pass filter 2316 and provided to an A/D converter (not shown) for the subsequent digital processing. The digital processing may correspond to the digital processing of the OFDM receiver 650 of FIG. 7. Intermediate frequency image filters are not shown. The one intermediate frequency receiver is shown in FIG. 23. There may be several intermediate frequencies and several fixed notch filters at different intermediate frequencies. Typically several intermediate frequencies are used to improve receiver out-band blocking performance.

The mixing signal for the mixers 2313, 2315 is provided by a local oscillator arrangement.

In this arrangement, an automatic frequency control (AFC) signal controls the oscillation frequency of a voltage controlled crystal oscillator block 2321. The output signal or frequency of the voltage controlled crystal oscillator block 2321 is provided on the one hand to a first phase locked loop (PLL) comprising a phase detector (PD) 2322, a low pass filter 2323, a voltage controlled oscillator (VCO) 2324 and a frequency divider (1/N) 2325. The output of the VCO 2324 is used as a mixing signal for the first mixer 2313. The output signal of the voltage controlled crystal oscillator block 2321 is provided on the other hand to a second PLL comprising a phase detector 2326, a low pass filter 2327, a VCO 2328 and a frequency divider (1/N) 2329. The output of the VCO 2328 is used as a mixing signal for the second mixer 2315. The frequency divider blocks 2325 and 2329 may be implemented with integer ratio or fractional divider topologies.

The AFC control signal controls the voltage controlled crystal oscillator block 2321 in accordance with a control signal from a controller 2330. The controller 2330 generates a control signal depending on the harmonics or inter-modulation products of GSM transceiver transmissions. Typically the AFC signal is used only to compensate the Doppler-effect, which means a received signal frequency change when mobile terminal is moving towards or away from a base station. In the present embodiment of the invention, the AFC signal is a combination of Doppler-effect compensation and harmonic or inter-modulation product filtering control.

The intermediate frequencies may be higher or lower than original reception frequency of receiver part 2300 or than a previous intermediate frequency. The intermediate frequency selection is dependent on supported system and receiver requirement of the system.

In an alternative embodiment of the invention the controller 2330 controls the synthesizer blocks 2325 and 2329 so that the intermediate frequencies are changed so that the fixed notch filter stop bands are placed optimally related to the interference frequencies.

FIG. 24 is a diagram illustrating the frequency response of a fixed notch filter 2314 receiving as input a variable IF signal output by mixer 2313. When using a low intermediate frequency, the notch lies above the bandwidth of the DVB-H channel. When using a high intermediate frequency, the notch lies below the bandwidth of the DVB-H channel. The intermediate frequency can now be tuned by the crystal oscillator block 2321 or by controlling the blocks 2325 and 2329 between these extremes. When using any medium intermediate frequency, the notch lies within the bandwidth of the DVB-H channel. That is, the tuned filtering is carried out by adjusting the employed intermediate frequency by providing a corresponding mixing signal to the first mixer 2313, not by tuning the notch filter 2314 itself. The variation of the intermediate frequency is compensated by a corresponding change of the mixing signal that is provided to the second mixer 2315 for converting the intermediate frequency signal to the baseband.

FIG. 25 is a diagram illustrating an operation at a center intermediate frequency.

At the intermediate frequency stage thus, always the same frequency is filtered, but when the signal is converted to baseband by the second mixer 2315, a respectively different baseband frequency has been removed.

While the presented embodiments use an OFDM receiver 650, it is to be understood that it could be employed for other types of receivers as well. It might be noted, however, that the invention is of particular advantage for OFDM receivers, as illustrated in FIGS. 26 and 27.

The OFDM system is based on using several narrow sub-carriers 2601 within a selected RF channel. This is illustrated in the diagram on the upper left hand side of FIG. 26.

Other systems, like the WCDMA and the GSM systems are covering the RF channel 2611 as a whole with their modulation. A corresponding CDMA modulation is illustrated in the diagram on the upper right hand side of FIG. 26.

Figure 26:
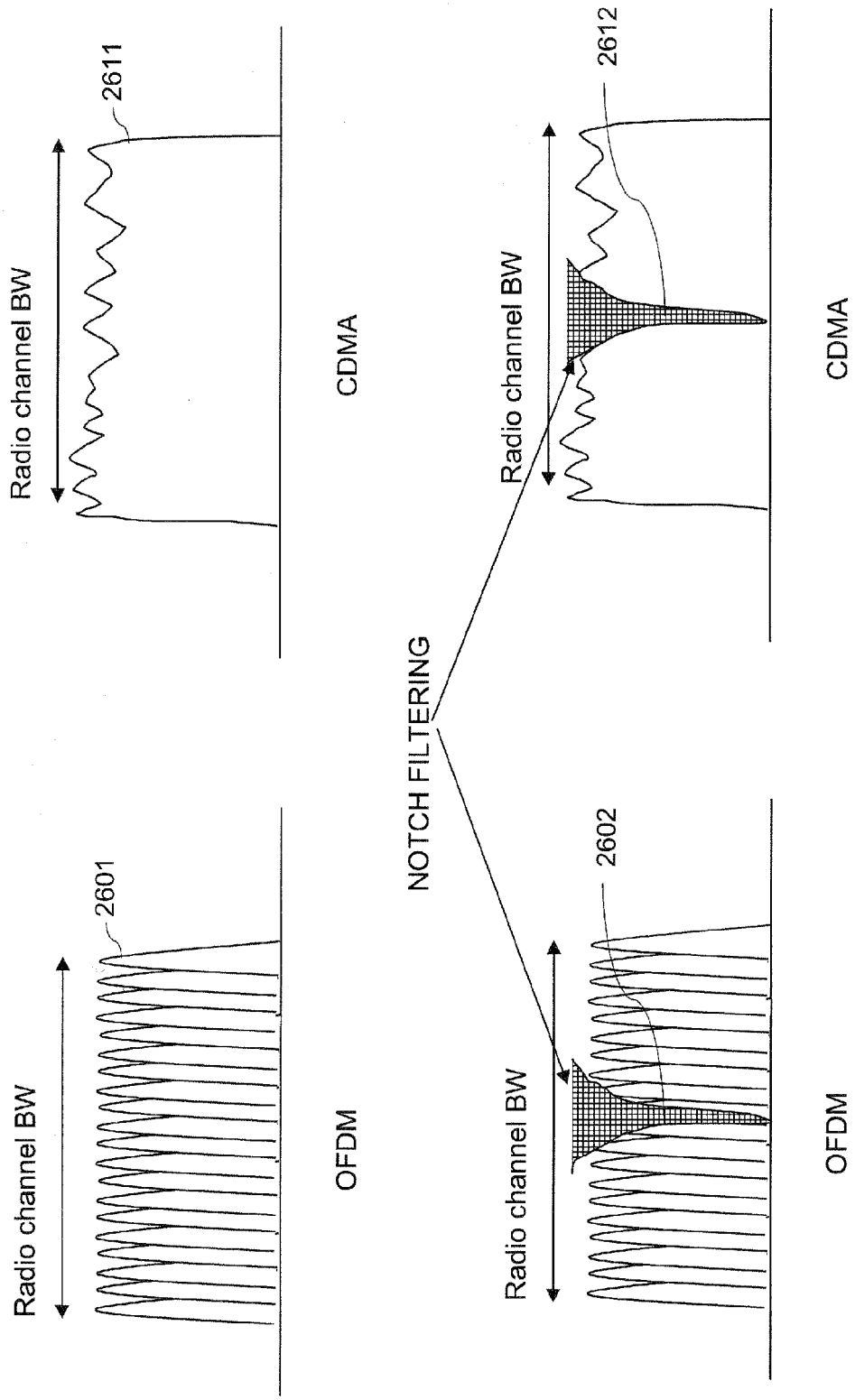
FIG. 26 is a diagram illustrating the advantageous use of the invention for OFDM receivers.
Figure 27:
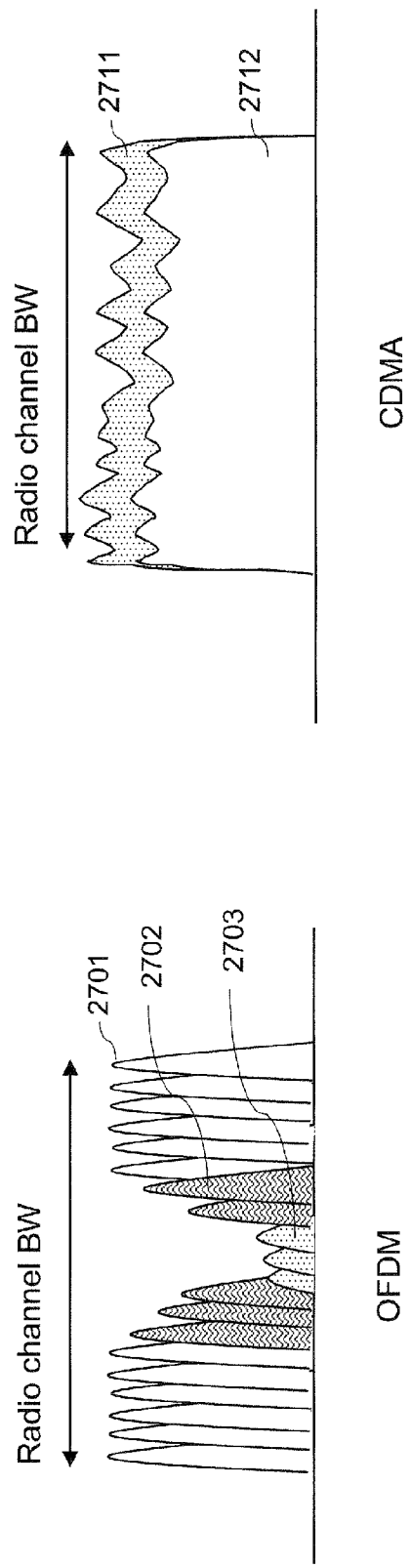
FIG. 27 is a continuation of the diagram of FIG. 26.

A notch filtering 2602 of a received OFDM signal is illustrated in the diagram on the lower left hand side of FIG. 26, while a notch filtering 2612 of a received CDMA signal is illustrated in the diagram on the lower right hand side of FIG. 26.

The resulting filtered signals are illustrated in the diagram on the left hand side of FIG. 27 for OFDM and in the diagram on the right hand side of FIG. 27 for CDMA.

It can be seen in FIG. 27 that due to its special modulation, the OFDM system is quite robust against a narrow band filtering that occurs inside of the OFDM channel. After a notch filtering, some OFDM sub-carriers 2703 are lost completely and some adjacent sub-carriers 2702 are degraded due to a roll-off effect, but most of the sub-carriers 2701 keep their original S/N ratio. That is, a clear reception is possible at these unchanged sub-carriers 2701, and a reliable bit-detection can be performed based on the contained symbols. Only the S/N ratio of the lost and the degraded sub-carrier data bits is reduced. The degraded sub-carriers 2702 can be weighted for reducing their influence in the bit detection, as indicated above.

Further, it can be seen in FIG. 27 that when a similar narrow band filtering is performed within a CDMA signal, then the entire bandwidth is affected. For a CDMA signal, the jammer removal filtering reduces the total level 2711 of the received signal resulting in a reduced signal level 2712, which affects all symbols. Thus, the overall signal S/N ratio is reduced.

Figure 28:
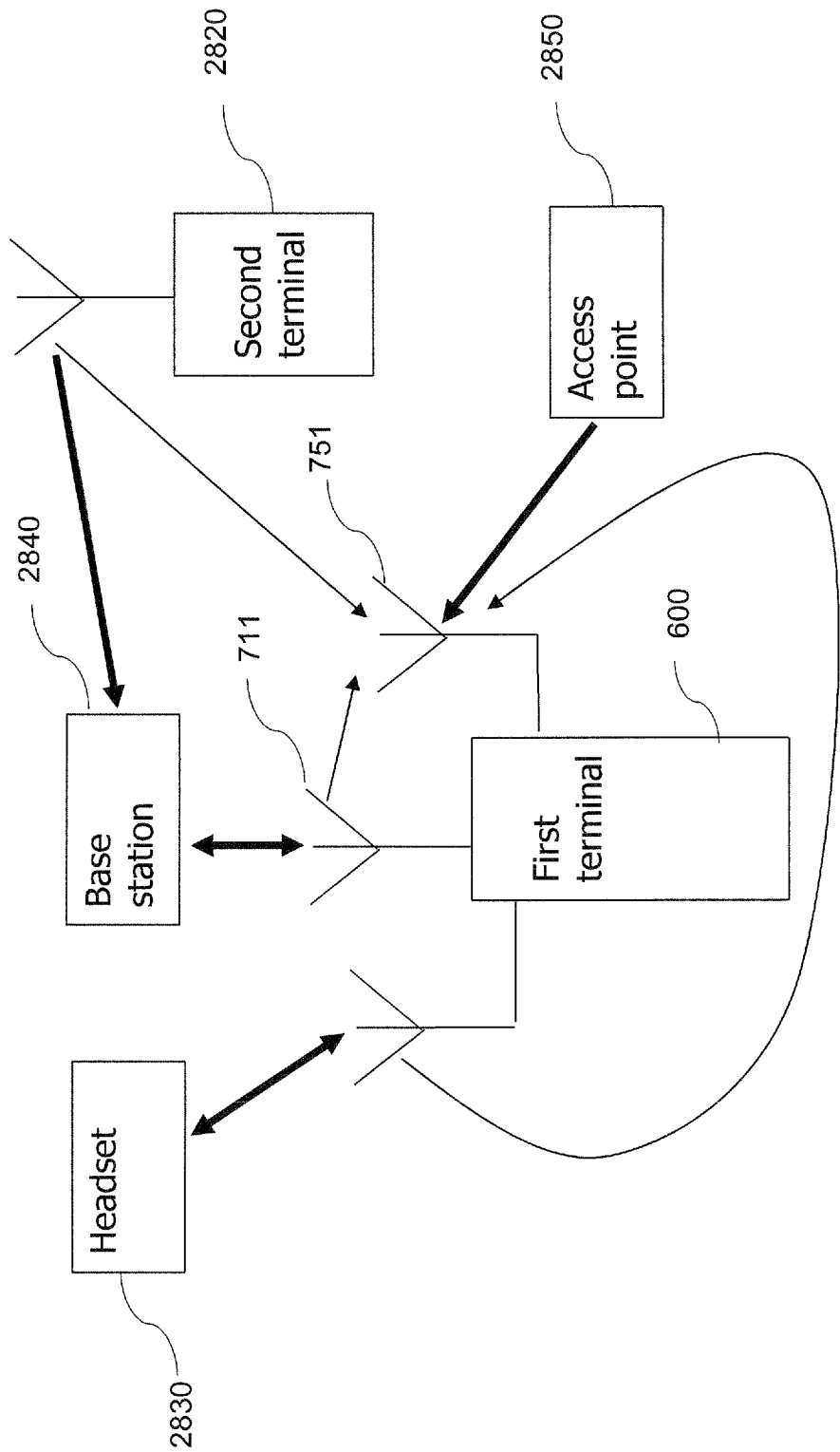
FIG. 28 is a diagram of a system with a first mobile terminal and another interfering terminal.

FIG. 28 presents an interference situation involving several mobile terminals that are located near by each other. The presented first terminal may be the electronic device 600 of FIG. 6. The electronic device 600 is connected via antenna 711 to a cellular network base station 2840. At the same time, the electronic device 600 can be connected via a further antenna to a wireless headset or another remote device 2830. The electronic device 600 may further have an active WLAN connection to a wireless local network access point 2850 via antenna 751 at the same time. The second user terminal 2820 is shown for illustration purposes, only. The connections to the headset 2830 and to the base station 2840 may cause interferences in the antenna 751 of the electronic device 600. A further connection between the second terminal 2820 and the base station 2840 may also cause interferences in the antenna 751.

Figure 29:
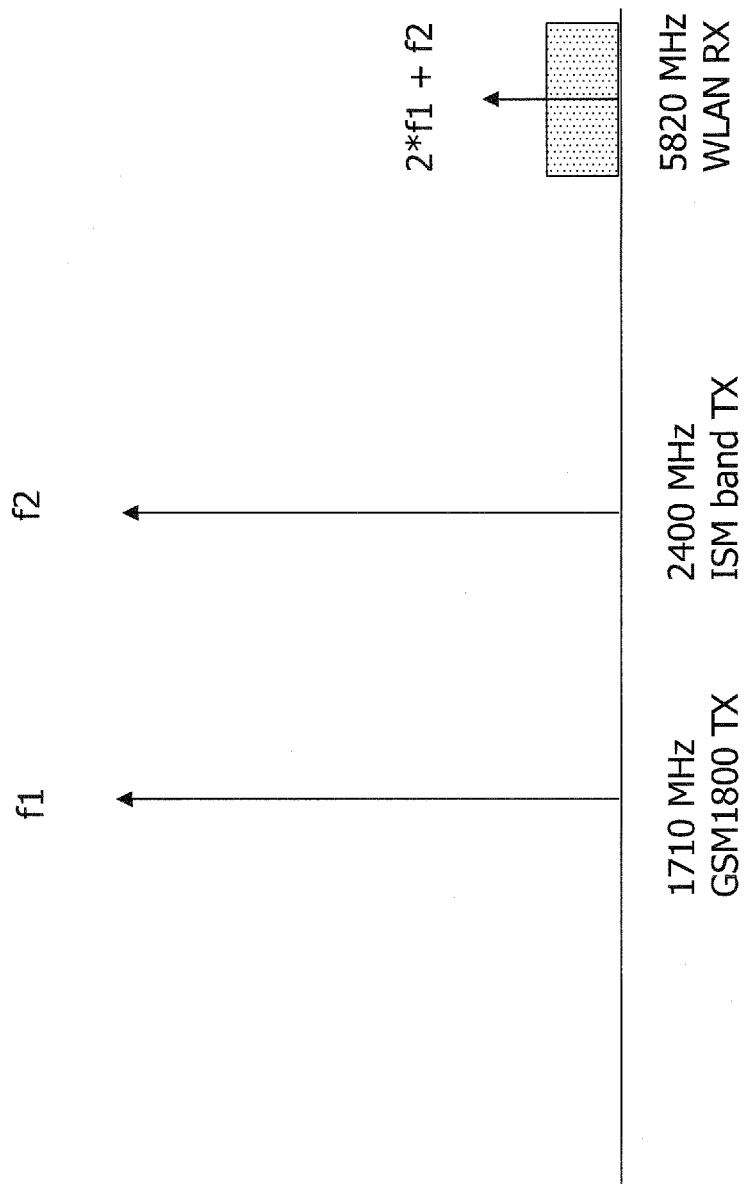
FIG. 29 is a diagram illustrating an interference signal scenario in the system of FIG. 28.

FIG. 29 is a diagram illustrating the interference situation in the antenna 751. If the connection between the electronic device 600 and the base station 2840 is operating at a frequency of f1=1710 MHz and the connection between the electronic device 600 and the headset 2830 is operating at a frequency of f2=2400 MHz, then an interfering inter-modulation product will have a frequency of 2*f1+f2=5820 MHz. This frequency may fall into the operating frequency range of the WLAN connection between the electronic device 600 and the access point 2850. This interfering mixing product can be already defined in interference detection block 645. The receiver 650, which is connected to antenna 751, may then be controlled in accordance with the invention.

A similar interference situation may occur when the primary connection between the second terminal 2820 and the base station 2840 is operating at a frequency of f1=1710 MHz and the connection between the electronic device 600 and the headset 2830 is operating at a frequency of f2=2400 MHz. The connection between the second terminal 2820 and the antenna 751 is an unintentional interference transmission leakage from the connection between the second terminal 2820 and the base station 2840. Also in this case, the interfering inter-modulation product will appear at a frequency of 5820 MHz, which may fall into the operating frequency range of a WLAN connection between the electronic device 600 and the access point 2850. The receiver 650 may be controlled in this situation in accordance with the invention as well.

It is to be understood that the described adjustments of the receiver characteristics could be performed in a different order as well, if needed. Some of the adjustment steps may also be ignored, if preferred.

It is to be noted that the described embodiments constitute only some of a variety of possible embodiments of the invention.

The invention claimed is:

1. Method comprising:
  determining whether and at which frequency at least one of a higher harmonic of and an inter-modulation product with signals generated by at least one component causes interference in a signal received by a receiver, based on information about signals generated by said at least one component, wherein the information is determined directly from signals controlling said at least one component, and wherein said at least one component is at least one component different from said receiver; and
  adjusting at least one characteristic of said receiver to diminish an influence by a determined interference, wherein the adjustment comprises adjusting a filtering of said signal received by said receiver at least in an analog domain to filter said frequency of said determined interference from said signal received by said receiver, and adjusting an additional filtering in a digital domain, the filtering in the analog domain being effected by an analog component receiving an analog signal as input and the filtering in the digital domain being effected by a digital component receiving a digital signal as input, wherein adjusting at least one characteristic of said receiver comprises:

determining a timing at which a higher harmonic of or an inter-modulation product with signals generated by said at least one component causes interference in a signal received by said receiver, based on information about signals generated by said at least one component; and at least one of:

interrupting a bit detection, which is performed on said signals received by said receiver, based on said determined timing; and adjusting at least one of a coding and a modulation scheme that is applied to data in said signals received by said receiver synchronized to said determined timing.

2. Method according to claim 1, wherein said receiver is an orthogonal frequency division multiplex receiver.

3. Method according to claim 1, wherein said at least one component comprises at least one of a transmitter for a mobile communication link;
a transmitter for a wireless communication link;
a processor;
a display; and
a memory.

4. Method according to claim 1, wherein said filtering in said analog domain is adjusted by adjusting a notch frequency of a notch filter filtering said signal received by said receiver, and wherein said filtering in said digital domain is another type of filtering than a notch filtering.

5. Method according to claim 1, wherein said filtering in said analog domain is applied to said signal received by said receiver at an intermediate frequency and wherein said filtering is adjusted by adjusting said intermediate frequency, said signal at an adjusted intermediate frequency being filtered with a notch filtering using a fixed notch frequency.

6. Method according to claim 1, wherein said receiver comprises an antenna and wherein adjusting at least one characteristic of said receiver comprises adjusting a resonance frequency of said antenna with a tuning circuitry.

7. Method according to claim 1, wherein adjusting at least one characteristic of said receiver comprises:

determining a power level of a higher harmonic of or an inter-modulation product with signals generated by said at least one component, which causes interference in a signal received by said receiver, based on information about signals generated by said at least one component; and at least one of controlling a gain of a variable amplifier of said receiver based on said determined power level; and adjusting a range of an analog-to-digital conversion, which is applied to said signal received by said receiver after said filtering in said analog domain.

8. Method according to claim 1, wherein adjusting at least one characteristic of said receiver comprises adjusting a further filtering of said signal received by said receiver in said digital domain to filter said frequency of said determined interference from said signal received by said receiver, wherein said further filtering in said digital domain is a different type of filtering than said additional filtering in said digital domain.

9. Method according to claim 1, wherein said receiver and said at least one component are integrated in a single device, and wherein said inter-modulation product is generated by said at least one component and an external interference source.

10. Method according to claim 1, wherein said at least one component comprises a transmitter including an antenna, said method further comprising calculating an antenna isolation between an antenna of said receiver and said antenna of said transmitter, and considering said antenna isolation for determining a power level of interferences caused by a higher harmonic of or an inter-modulation product with signals generated by said transmitter in a radio frequency band received by said receiver.

11. Method according to claim 1, wherein said information about signals generated by said at least one component is determined independently from the signals received by the receiver.

12. Method according to claim 1, wherein the filtering in the digital domain is at least one of compensating for non-ideality of the filtering in the analog domain and fine tuning the result of the filtering in the analog domain.

13. Apparatus comprising a non-transitory computer readable medium including software code and a processor, the computer readable medium including software code configured to, with the processor, cause a device to:

determine whether and at which frequency at least one of a higher harmonic of and an inter-modulation product with signals generated by at least one component causes interference in a signal received by a receiver, based on information about signals generated by said at least one component, wherein the information is determined directly from signals controlling said at least one component, and wherein said at least one component is at least one component different from said receiver; and adjust at least one characteristic of said receiver to diminish an influence by a determined interference, wherein the adjustment comprises adjusting a filtering of said signal received by said receiver at least in an analog domain to filter said frequency of said determined interference from said signal received by said receiver, and adjusting an additional filtering in a digital domain, the filtering in the analog domain being effected by an analog component receiving an analog signal as input and the filtering in the digital domain being effected by a digital component receiving a digital signal as input, wherein for adiusting at least one characteristic of said receiver, said software code, with said processor, is configured to cause the device at least to:

determine a timing at which a higher harmonic of or an inter-modulation product with signals generated by said at least one component causes interference in a signal received by said receiver, based on information about signals generated by said at least one component; and at least one of:

interrupt a bit detection, which is performed on said signals received by said receiver, based on said determined timing; and adjust at least one of a coding and a modulation scheme that is applied to data in said signals received by said receiver synchronized to said determined timing.

14. Apparatus according to claim 13 comprising said receiver.

15. Apparatus according to claim 13, wherein for adjusting at least one characteristic of said receiver said computer readable medium including software code configured to, with said processor, cause the device to apply said filtering in said analog domain to said signal received by said receiver at least at one of a radio frequency, an intermediate frequency and a base band frequency.

16. Apparatus according to claim 13, wherein for adjusting at least one characteristic of said receiver said computer readable medium including software code configured to, with said processor, cause the device to adjust said filtering in said analog domain by adjusting a notch frequency of a notch filter filtering said signal received by said receiver, and wherein said filtering in said digital domain is another type of filtering than a notch filtering.

17. Apparatus according to claim 13, wherein for adjusting at least one characteristic of said receiver said computer readable medium including software code configured to, with said processor, cause the device to apply said filtering in said analog domain to said signal received by said receiver at an intermediate frequency and to adjust said filtering by adjusting said intermediate frequency, said signal at an adjusted intermediate frequency being filtered with a notch filtering using a fixed notch frequency.

18. Apparatus according to claim 13, wherein said receiver comprises an antenna and a tuning circuitry, and wherein for adjusting at least one characteristic of said receiver said computer readable medium including software code configured to, with said processor, cause said device to adjust a resonance frequency of said antenna by means of said tuning circuitry.

19. Apparatus according to claim 13, wherein for adjusting at least one characteristic of said receiver, said computer readable medium including software code configured to, with said processor, cause said device to:
determine a power level of a higher harmonic of or an inter-modulation product with signals generated by said at least one component, which causes interference in a signal received by said receiver, based on information about signals generated by said at least one component; and
control a gain of a variable amplifier of said receiver based on said determined power level.

20. Apparatus according to claim 13, wherein for adjusting at least one characteristic of said receiver, said computer readable medium including software code configured to, with said processor, cause the device to:
determine a power level of a higher harmonic of or an inter-modulation product with signals generated by said at least one component, which causes interference in a signal received by said receiver, based on information about signals generated by said at least one component; and
adjust a range of an analog-to-digital conversion, which is applied to said signal received by said receiver after said filtering in said analog domain.

21. System comprising an apparatus according to claim 20 and a device including said at least one component operating in close proximity to said receiver and causing interferences in signals received by said receiver.

22. Apparatus according to claim 13, wherein for adjusting at least one characteristic of said receiver, said computer readable medium including software code configured to, with said processor, cause the device to adjust a further filtering of said signal received by said receiver in said digital domain to filter said frequency of said determined interference from said signal received by said receiver, wherein said further filtering in said digital domain is a different type of filtering than said additional filtering in said digital domain.

23. Apparatus according to claim 13, wherein for adjusting at least one characteristic of said receiver, said software code, with said processor, is configured to cause the device at least to:
determine a timing at which a higher harmonic of or an inter-modulation product with signals generated by said at least one component causes interference in a signal received by said receiver, based on information about signals generated by said at least one component; and
interrupt a bit detection, which is performed on said signals received by said receiver, based on said determined timing.

24. Apparatus according to claim 13, wherein for adjusting at least one characteristic of said receiver, said computer readable medium including software code configured to, with said processor, cause the device to:
determine a timing at which a higher harmonic of or an inter-modulation product with signals generated by said at least one component causes interference in a signal received by said receiver, based on information about signals generated by said at least one component; and
adjust at least one of a coding and a modulation scheme that is applied to data in said signals received by said receiver synchronized to said determined timing.

25. Apparatus according to claim 13, wherein said at least one component comprises a transmitter including an antenna, said computer readable medium including software code further configured to, with said processor, cause the device to calculate an antenna isolation between an antenna of said receiver and said antenna of said transmitter, and to consider said antenna isolation for determining a power level of interferences caused by a higher harmonic of or an inter-modulation product with signals generated by said transmitter in a radio frequency band received by said receiver.

26. Apparatus according to claim 13, wherein said apparatus is one of a chip and a mobile terminal.

27. Apparatus according to claim 13, wherein said filtering in the analog domain is a filtering of a first type, and wherein said filtering in the digital domain is a filtering of a second type which is different from said filtering of said first type.

28. Apparatus according to claim 13, wherein said information about signals generated by said at least one component is determined independently from the signals received by the receiver.

29. Apparatus according to claim 13, wherein the filtering in the digital domain is at least one of compensating for non-ideality of the filtering in the analog domain and fine tuning the result of the filtering in the analog domain.

30. Apparatus according to claim 13, wherein the adjustment comprises each of:
adjusting a resonance frequency of an antenna with a tuning circuitry;
adjusting a gain of a variable amplifier;
adjusting characteristics of a baseband filter;
adjusting a range of an analog-to-digital conversion;
adjusting characteristics of a digital finite impulse response filter;
adjusting a fast Fourier transform operation;
adjusting a bit detection operation; and
adjusting a decoding operation.

31. A non-transitory computer program product comprising a non-transitory computer readable medium storing software code for controlling a receiver, which receiver operates in close proximity to at least one component causing interferences in signals received by said receiver, said software code configured to cause a device to perform the following when said software code is executed by a processor:
determine whether and at which frequency at least one of a higher harmonic of and an inter-modulation product with signals generated by said at least one component causes interference in a signal received by said receiver, based on information about signals generated by said at least one component, wherein the information is determined directly from signals controlling said at least one component, and wherein said at least one component is at least one component different from said receiver; and adjust at least one characteristic of said receiver to diminish an influence by a determined interference, wherein the adjustment comprises adjusting a filtering of said signal received by said receiver at least in an analog domain to filter said frequency of said determined interference from said signal received by said receiver, and adjusting an additional filtering in a digital domain, the filtering in the analog domain being effected by an analog component receiving an analog signal as input and the filtering in the digital domain being effected by a digital component receiving a digital signal as input, wherein for adjusting at least one characteristic of said receiver, said software code is configured to, when executed by a processor, cause the device at least to:

determine a timing at which a higher harmonic of or an inter-modulation product with signals generated by said at least one component causes interference in a signal received by said receiver, based on information about signals generated by said at least one component; and at least one of:

interrupt a bit detection, which is performed on said signals received by said receiver, based on said determined timing; and adjust at least one of a coding and a modulation scheme that is applied to data in said signals received by said receiver synchronized to said determined timing.

32. An apparatus comprising:

means for determining whether and at which frequency at least one of a higher harmonic of and an inter-modulation product with signals generated by at least one component causes interference in a signal received by a receiver, based on information about signals generated by said at least one component, wherein the information is determined directly from signals controlling said at least one component, and wherein said at least one component is at least one component different from said receiver; and means for adjusting at least one characteristic of said receiver to diminish an influence by a determined interference, wherein the adjustment comprises adjusting a filtering of said signal received by said receiver at least in an analog domain to filter said frequency of said determined interference from said signal received by said receiver, and adjusting an additional filtering in a digital domain, the filtering in the analog domain being effected by an analog component receiving an analog signal as input and the filtering in the digital domain being effected by a digital component receiving a digital signal as input, wherein adjusting at least one characteristic of said receiver comprises:

determining a timing at which a higher harmonic of or an inter-modulation product with signals generated by said at least one component causes interference in a signal received by said receiver, based on information about signals generated by said at least one component; and at least one of:

interrupting a bit detection, which is performed on said signals received by said receiver, based on said determined timing; and adjusting at least one of a coding and a modulation scheme that is applied to data in said signals received by said receiver synchronized to said determined timing.

\* \* \* \* \*